US012703615B2

(12) United States Patent
Okuda et al.

(10) Patent No.: US 12,703,615 B2
(45) Date of Patent: Aug. 11, 2026

(54) MOVEMENT CONTROL DEVICE, MOVEMENT CONTROL SYSTEM, MOVEMENT CONTROL METHOD, AND PROGRAM

(71) Applicant: MITSUBISHI HEAVY INDUSTRIES, LTD., Tokyo (JP)

(72) Inventors: Tomoya Okuda, Tokyo (JP); Mitsuhisa Kawabe, Tokyo (JP); Sho Onodera, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 19/101,283

(22) PCT Filed: Aug. 31, 2023

(86) PCT No.: PCT/JP2023/031968
§ 371 (c)(1),
(2) Date: Feb. 5, 2025

(87) PCT Pub. No.: WO2024/053567
PCT Pub. Date: Mar. 14, 2024

(65) Prior Publication Data
US 2026/0042647 A1 Feb. 12, 2026

(30) Foreign Application Priority Data
Sep. 9, 2022 (JP) ................................. 2022-143634

(51) Int. Cl.
*B66F 9/06* (2006.01)
*B66F 9/075* (2006.01)

(52) U.S. Cl.
CPC .......... *B66F 9/063* (2013.01); *B66F 9/07568* (2013.01); *B66F 9/07586* (2013.01)

(58) Field of Classification Search
CPC ........ B66F 9/06; B66F 9/063; B66F 9/07568; B66F 9/07586
(Continued)

(56) References Cited

U.S. PATENT DOCUMENTS 12,194,800 B2 * 1/2025 Kim ......................... B60G 5/04
2016/0002016 A1 1/2016 McVicar et al.
(Continued)

FOREIGN PATENT DOCUMENTS

CN 113697727 A 11/2021
JP 5-178232 A 7/1993
(Continued)

OTHER PUBLICATIONS

International Search Report for International Application No. PCT/JP2023/031968, dated Nov. 7, 2023, with English translation.
(Continued)

*Primary Examiner* — Andrew Joseph Rudy
(74) *Attorney, Agent, or Firm* — Birch, Stewart, Kolasch & Birch, LLP

(57) ABSTRACT

This movement control device controls each wheel of a vehicle including a first wheel capable of driving and capable of steering, a second wheel capable of steering, and a third wheel capable of steering. The movement control device comprises: a rotation signal generation unit that generates a rotation signal for controlling each wheel such that a traveling direction of the vehicle is changed with one of the second wheel and the third wheel as a center of rotation when viewed from a vertical direction; a translation signal generation unit that generates a translation signal for controlling each wheel such that, when changing the traveling direction of the vehicle, one of the second wheel and the third wheel that is the center of rotation is moved in one direction that crosses the traveling direction; a signal com-
(Continued)

bining unit that generates a wheel control signal in which the rotation signal and the translation signal are combined; and a wheel control unit that controls each wheel on the basis of the wheel control signal.

6 Claims, 14 Drawing Sheets

(58) Field of Classification Search
USPC .......................................................... 701/25
See application file for complete search history.

(56) References Cited

U.S. PATENT DOCUMENTS

| | | | | |
|---|---|---|---|---|
| 2020/0079334 | A1* | 3/2020 | Ernst | B60T 17/22 |
| 2022/0281727 | A1 | 9/2022 | Yoshida et al. | |

FOREIGN PATENT DOCUMENTS

| | | | |
|---|---|---|---|
| JP | 8-113156 | A | 5/1996 |
| JP | 2004-348678 | A | 12/2004 |
| JP | 2008-87891 | A | 4/2008 |
| JP | 2013-60257 | A | 4/2008 |
| JP | 2010-18054 | A | 1/2010 |
| JP | 2022-136580 | A | 9/2022 |

OTHER PUBLICATIONS

Written Opinion of the International Searching Authority for International Application No. PCT/JP2023/031968, dated Nov. 7, 2023, with English translation.

* cited by examiner

MOVEMENT CONTROL DEVICE, MOVEMENT CONTROL SYSTEM, MOVEMENT CONTROL METHOD, AND PROGRAM

TECHNICAL FIELD

The present disclosure relates to a movement control device, a movement control system, a movement control method, and a program.

Priority is claimed to Japanese Patent Application No. 2022-143634, filed Sep. 9, 2022, the content of which is incorporated herein by reference.

BACKGROUND ART

For example, PTL 1 discloses an omnidirectional moving bogie including four wheels (omniwheels) that are drivable and steerable. The omnidirectional moving bogie can freely change a traveling direction even in a narrow passage or the like sandwiched between wall bodies.

CITATION LIST

Patent Literature

[PTL 1] Japanese Unexamined Patent Application Publication No. 2004-348678

SUMMARY OF INVENTION

Technical Problem

Meanwhile, in the omnidirectional moving bogie disclosed in PTL 1, for example, in a case where a traveling direction is to be changed, it is necessary to drive four wheels at the same time with the same force (torque). Therefore, there may be a case where a structure for driving the four wheels is enlarged or a case where it is necessary to synchronize the driving wheels with each other. Therefore, there is a demand for a moving body that can be changed in a narrow passage while including a wheel having a simpler configuration.

The present disclosure has been made to solve the above problems, and an object of the present disclosure is to provide a movement control device, a movement control system, a movement control method, and a program capable of smoothly changing a traveling direction of the moving body including a wheel having a simplified configuration in a narrow passage.

Solution to Problem

In order to achieve the above object, according to the present disclosure, there is provided a movement control device that controls each wheel of a moving body having a first wheel that is drivable and steerable, a second wheel that is steerable, and a third wheel that is steerable, the movement control device including: a rotation signal generation unit that generates a rotation signal for controlling each wheel such that a traveling direction of the moving body is changed with one of the second wheel and the third wheel as a rotation center when viewed from a vertical direction; a translation signal generation unit that generates a translation signal for controlling each wheel such that one of the second wheel and the third wheel as the rotation center is moved in one direction intersecting the traveling direction in a case where the traveling direction of the moving body is changed; a signal synthesis unit that generates a wheel control signal obtained by synthesizing the rotation signal and the translation signal; and a wheel control unit that controls each wheel based on the wheel control signal.

According to the present disclosure, there is provided a movement control system including the moving body and the movement control device.

A movement control method according to the present disclosure is a movement control method of controlling each wheel of a moving body having a first wheel that is drivable and steerable, a second wheel that is steerable, and a third wheel that is steerable, the movement control method including: a rotation signal generation step of generating a rotation signal for controlling each wheel such that a traveling direction of the moving body is changed with one of the second wheel and the third wheel as a rotation center when viewed from a vertical direction; a translation signal generation step of generating a translation signal for controlling each wheel such that one of the second wheel and the third wheel as the rotation center is moved in one direction intersecting the traveling direction in a case where the traveling direction of the moving body is changed; a signal synthesis step of generating a wheel control signal obtained by synthesizing the rotation signal and the translation signal; and a wheel control step of controlling each wheel based on the wheel control signal.

Further, according to the present disclosure, there is provided a program causing a computer of a movement control device that controls each wheel of a moving body having a first wheel that is drivable and steerable, a second wheel that is steerable, and a third wheel that is steerable, to execute:

- a step of generating a rotation signal for controlling each wheel such that a traveling direction of the moving body is changed with one of the second wheel and the third wheel as a rotation center when viewed from a vertical direction;
- a step of generating a translation signal for controlling each wheel such that one of the second wheel and the third wheel as the rotation center is moved in one direction intersecting the traveling direction in a case where the traveling direction of the moving body is changed;
- a step of generating a wheel control signal obtained by synthesizing the rotation signal and the translation signal; and
- a step of controlling each wheel based on the wheel control signal.

Advantageous Effects of Invention

According to the present disclosure, it is possible to provide a movement control device, a movement control system, a movement control method, and a program capable of smoothly changing a traveling direction of a moving body including a wheel having a simplified configuration in a narrow passage.

DESCRIPTION OF EMBODIMENTS

The movement control device, the movement control system, the movement control method, and the program according to the embodiments of the present disclosure will be described with reference to the drawings.

First Embodiment (Movement Control System)

A movement control system is a system that controls movement of a moving body. The movement control system according to the present embodiment controls, for example, movement of a forklift as a moving body that performs cargo handling operations such as loading and unloading of a piece of cargo, transportation, and the like in a logistics facility such as a logistics center or a warehouse.

Figure 1:
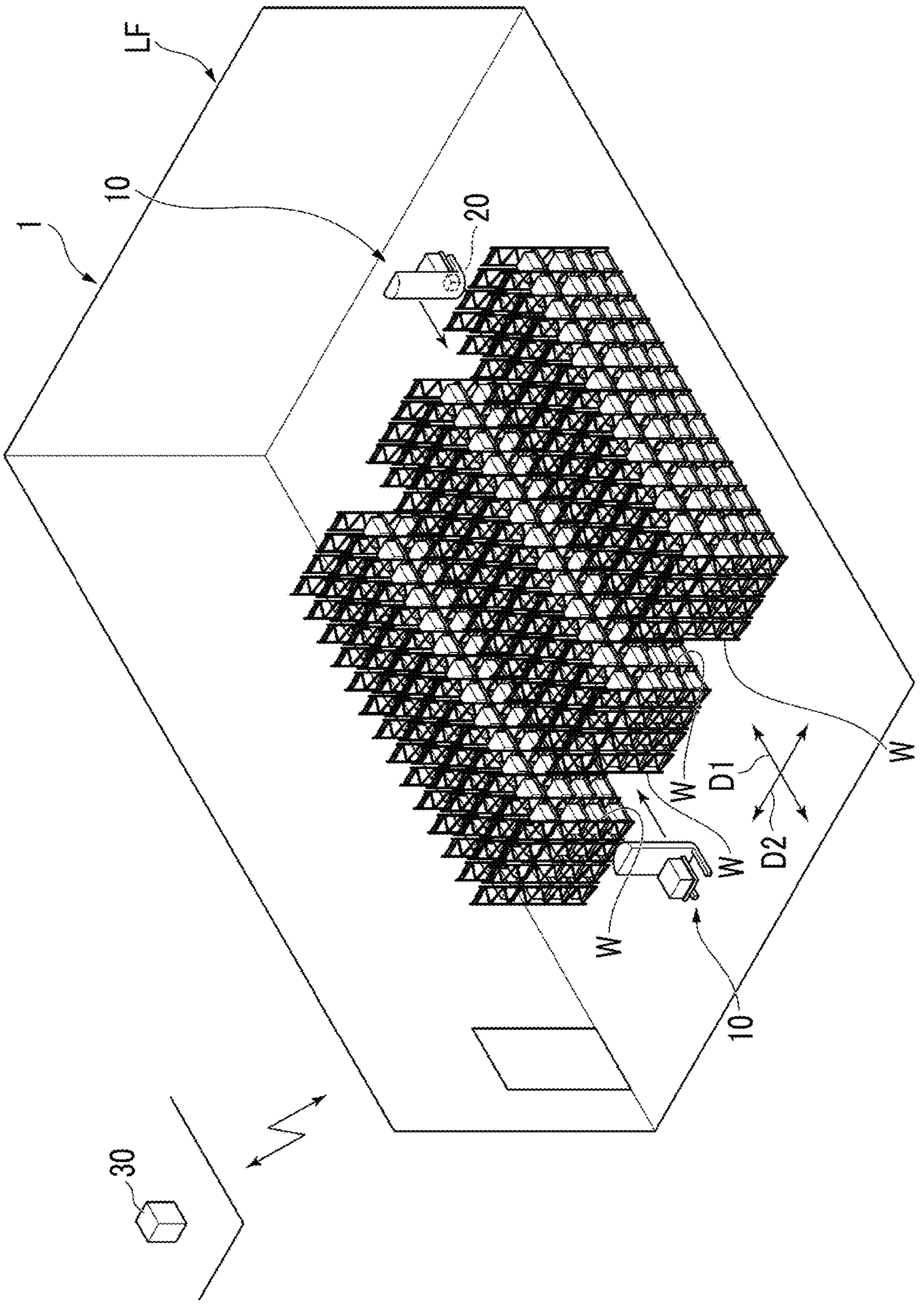
FIG. 1 is a perspective view showing an overall configuration of a moving body control system according to an embodiment of the present disclosure.

Here, as shown in FIG. 1, a moving body 10 according to the present embodiment passes through a passage in a case where the moving body 10 moves the piece of cargo from a predetermined position to a target position in a logistics facility LF. The passage is interposed between a pair of wall bodies W facing each other and extends in one direction.

The wall body W according to the present embodiment may be, for example, a rack or the like on which a plurality of pieces of cargo or the like are placed. Hereinafter, the one direction in which the passage extends will be referred to as a "passage extension direction D1", and a width direction of the passage that is a direction in which the pair of wall bodies W face each other will be referred to as a "passage width direction D2". The passage extension direction D1 and the passage width direction D2 are directions orthogonal to each other.

A movement control system 1 includes a moving body 10, a movement control device 20, and a host device 30.

(Moving Body)

The moving body 10 is an industrial vehicle that moves a piece of cargo placed on a pallet in the logistics facility LF. The moving body 10 according to the present embodiment is, for example, a vehicle that travels independently in accordance with a command received from the host device 30, and is a reach-type automated guided forklift (AGF).

Figure 2:
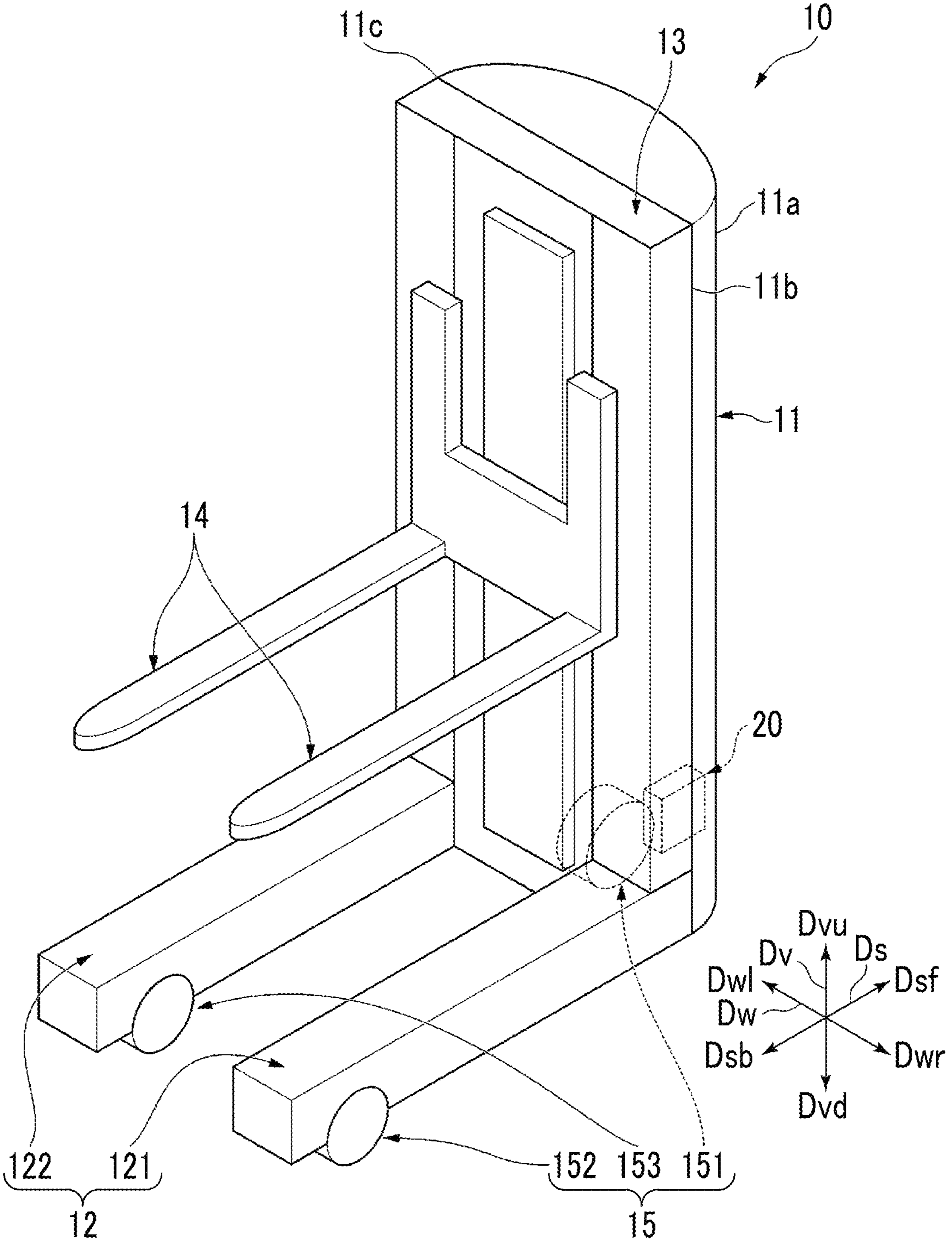
FIG. 2 is a perspective view showing a configuration of a moving body according to a first embodiment of the present disclosure.

As shown in FIG. 2, the moving body 10 according to the present embodiment includes a car body 11, a straddle leg 12, a mast 13, a fork 14, and a traveling mechanism 15.

(Car Body)

The car body 11 is a body portion of the moving body 10 and travels on a road surface in the logistics facility LF by means of the traveling mechanism 15. For convenience of description, a direction in which the car body 11 travels (a direction in which the car body 11 travels forward and backward) will be referred to as a "traveling direction Ds". Further, of two sides in the traveling direction Ds, a forward side is referred to as a "forward side Dsf", and a backward side which is a side opposite to the forward side Dsf is referred to as a "backward side Dsb".

In addition, a width direction of the car body 11 is referred to as a "car width direction Dw". Further, of two sides in the car width direction Dw, a right side in a case in which the car body 11 is viewed from the backward side Dsb is referred to as a "one side Dwr", and a side which is an opposite side to the one side Dwr is referred to as the "other side Dwl".

The car body 11 has an end edge 11*b* extending in a vertical direction Dv disposed on the one side Dwr and an end edge 11*c* extending on the other side Dwl. In addition, the car body 11 has a front surface 11*a* facing the forward side Dsf in a state of being connected to extend over the end edge 11*b* on the one side Dwr and the end edge 11*c* on the other side Dwl and in the car width direction Dw. The front surface 11*a* has a convex curved surface shape that is convex toward the forward side Dsf.

For convenience of description, a side on which gravity in the vertical direction Dv acts is referred to as a "lower side Dvd", and a side which is an opposite side to the lower side Dvd is referred to as an "upper side Dvu".

(Straddle Leg)

The straddle legs 12 are integrally provided on a portion of the car body 11 on the backward side Dsb and the lower side Dvd. The straddle legs 12 are a pair of shaft-like members extending from the car body 11 to the backward side Dsb. The pair of straddle legs 12 are disposed in a state of being spaced apart from each other in the car width direction Dw.

Hereinafter, the straddle leg 12 disposed on the one side Dwr of the pair of straddle legs 12 will be referred to as a "right straddle leg 121", and the straddle leg 12 disposed on a side (the other side Dwl) opposite to the right straddle leg 121 will be referred to as a "left straddle leg 122".

(Mast)

The mast 13 is movably provided on the straddle legs 12. The mast 13 is attached to both the right straddle leg 121 and the left straddle leg 122. The mast 13 can be moved on the straddle legs 12 in the traveling direction Ds. The mast 13 extends from each of the right straddle leg 121 and the left straddle leg 122 to the upper side Dvu.

(Fork)

A pair of forks 14 are provided in the mast 13 in a state of extending from the mast 13 to the backward side Dsb. A pair of forks 14 are disposed in a state of being spaced from each other in the car width direction Dw, and are attached to the mast 13 so as to be movable (elevatable) in a vertical direction Dv with respect to the mast 13.

The fork 14 is inserted into, for example, fork pockets of the pallet by moving to the upper side Dvu (lifting up) and moving to the backward side Dsb together with the mast 13 (reach out). The fork 14 can move the piece of cargo placed on the pallet together with the pallet by being inserted into fork pockets.

(Traveling Mechanism)

The traveling mechanism 15 supports the car body 11 and the straddle leg 12 from the lower side Dvd in the vertical direction Dv and allows the car body 11 and the straddle leg 12 to be movable on a road surface.

Figure 3:
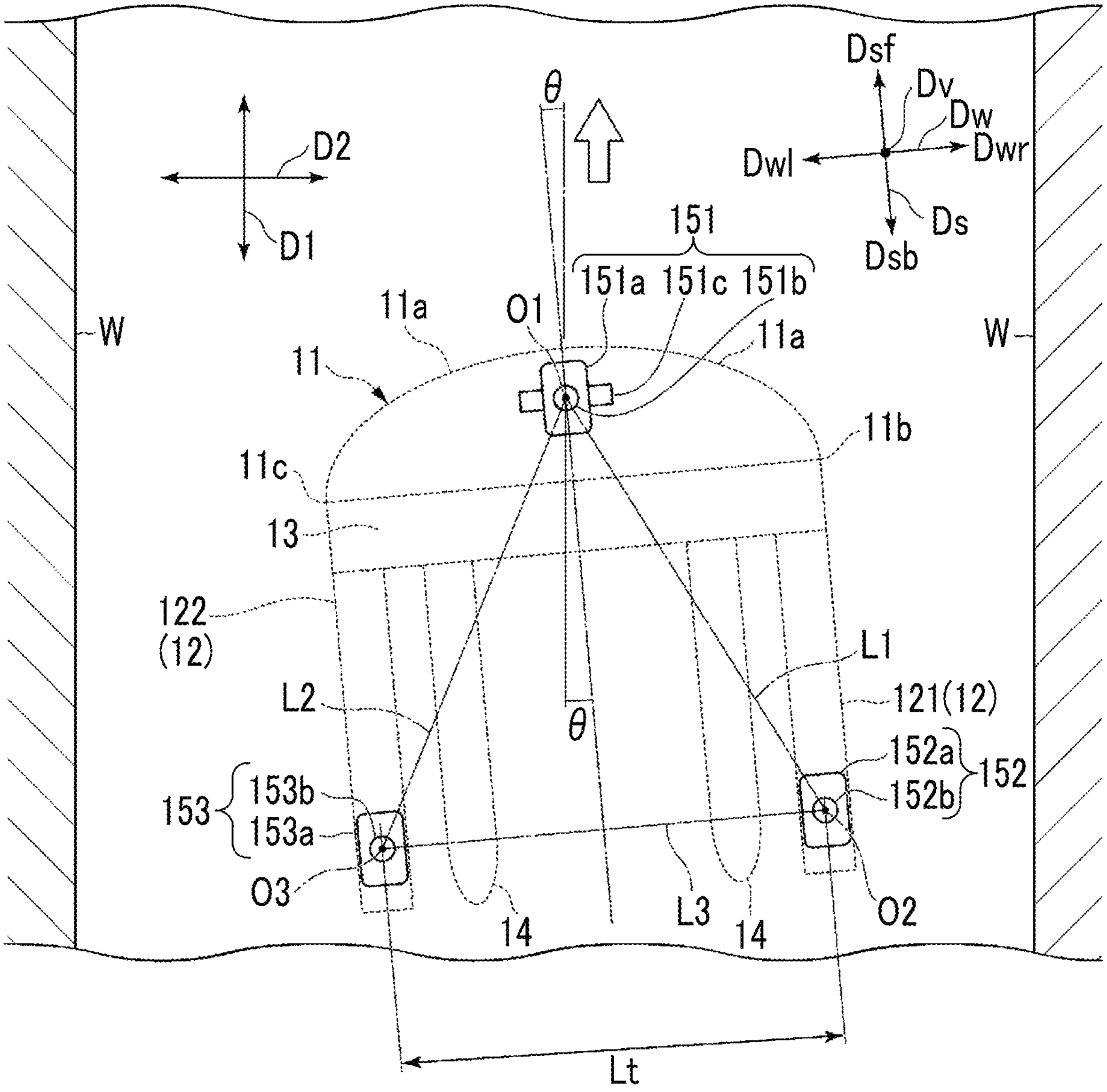
FIG. 3 is a diagram showing a traveling mechanism according to the first embodiment of the present disclosure as viewed from an upper side.

As shown in FIGS. 2 and 3, the traveling mechanism 15 in the present embodiment has a first wheel 151, a second wheel 152, and a third wheel 153.

The first wheel 151 is provided in a vehicle main body. As shown in FIG. 3, the first wheel 151 includes a first wheel body 151*a* that can rotate while coming into contact with the road surface, a drive motor 151*c* that rotates the first wheel body 151*a* in a state where the first wheel body 151*a* comes into contact with the road surface, and a first steering motor 151*b* that can change a direction of the first wheel body 151*a*. The drive motor 151*c* and the first steering motor 151*b* are connected to the first wheel body 151*a*.

The drive motor 151*c* is rotated based on a signal indicating a driving instruction transmitted from the movement control device 20. Specifically, the drive motor 151*c* receives a signal indicating the rotation speed from the movement control device 20 and rotates at the rotation speed to rotate the first wheel body 151*a*.

The first steering motor 151*b* can be rotationally moved about a first rotational axis line O1 extending in the vertical direction Dv. The first steering motor 151*b* steers the first wheel body 151*a* based on the signal indicating a steering instruction transmitted from the movement control device 20.

Specifically, the first steering motor 151*b* receives a signal indicating the rotation angle from the movement control device 20 and sets its own posture to the rotation angle. That is, as a result of adjusting the inclination of the first wheel body 151*a* with respect to the traveling direction Ds by rotating the first steering motor 151*b*, the direction of the first wheel body 151*a* is changed. In the present embodiment, for example, the direction of the forward side Dsf is 0° of the rotation angle.

The second wheel 152 is provided at an end portion on the backward side Dsb in the right straddle leg 121. The second wheel 152 includes a second wheel body 152*a* that can rotate while coming into contact with the road surface, and a second steering motor 152*b* that can change the direction of the second wheel body 152*a*.

The second steering motor 152*b* is connected to the second wheel body 152*a*. The second steering motor 152*b* can be rotationally moved about a second rotational axis line O2 extending in the vertical direction Dv. The second steering motor 152*b* steers the second wheel body 152*a* based on the signal indicating the steering instruction transmitted from the movement control device 20.

Specifically, the second steering motor 152*b* receives a signal indicating the rotation angle from the movement control device 20 and sets its own posture to the rotation angle. That is, as a result of adjusting the inclination of the second wheel body 152*a* with respect to the traveling direction Ds by rotating the second steering motor 152*b*, the direction of the second wheel body 152*a* is changed.

The third wheel 153 is provided at an end portion on the backward side Dsb in the left straddle leg 122. The third wheel 153 includes a third wheel body 153*a* that can rotate while coming into contact with the road surface, and a third steering motor 153*b* that can change the direction of the third wheel body 153*a*.

The third steering motor 153*b* is connected to the third wheel body 153*a*. The third steering motor 153*b* can be rotationally moved about a third rotational axis line O3 extending in the vertical direction Dv. The third steering motor 153*b* steers the third wheel body 153*a* based on the signal indicating the steering instruction transmitted from the movement control device 20.

Specifically, the third steering motor 153*b* receives a signal indicating the rotation angle from the movement control device 20 and sets its own posture to the rotation angle. That is, as a result of adjusting the inclination of the third wheel body 153*a* with respect to the traveling direction Ds by rotating the third steering motor 153*b*, the direction of the third wheel body 153*a* is changed.

Here, in the present embodiment, a virtual triangle is formed in a case where a first virtual line L1 connecting the first rotational axis line O1 and the second rotational axis line O2, a second virtual line L2 connecting the first rotational axis line O1 and the third rotational axis line O3, and a third virtual line L3 connecting the second rotational axis line O2 and the third rotational axis line O3 are viewed from the vertical direction Dv. For example, the triangle has an isosceles triangular shape in which the length of the first virtual line L1 and the length of the second virtual line L2 are equal in a view from the vertical direction Dv.

That is, a distance (length of the first virtual line L1) between the first rotational axis line O1 and the second rotational axis line O2 in a two-dimensional plane coordinate system consisting of the passage extension direction D1 and the passage width direction D2 is equal to a distance (length of the second virtual line L2) between the first rotational axis line O1 and the third rotational axis line O3. In the present embodiment, the distance (length of the third virtual line L3) between the second rotational axis line O2 and the third rotational axis line O3 is shorter than the length of the first virtual line L1 and the length of the second virtual line L2. Further, in the present embodiment, the length of the third virtual line L3 is denoted by "Lt".

In the following, a case where the moving body 10 moves in the passage will be described as an example in a two-dimensional plane coordinate system consisting of the passage extension direction D1 and the passage width direction D2.

In addition, a case where the traveling direction Ds of the moving body 10 is inclined by θ° with respect to the passage extension direction D1 will be described as an example.

(Movement Control Device)

In a case where the moving body 10 arrives at a target position X (see FIG. 5) in the logistics facility LF, the movement control device 20 controls each wheel (the first wheel 151, the second wheel 152, and the third wheel 153) of the moving body 10 to change the direction (traveling direction Ds) of the moving body 10.

The "target position X" mentioned here means, for example, a position at which the moving body 10 can perform cargo handling operations such as loading and unloading of the piece of cargo in the passage, and is a place where the direction (traveling direction Ds) of the moving body 10 is changed. The target position X is set by, for example, the host device 30. Therefore, the movement control device 20 receives a signal indicating the target position X from the host device 30. The target position X is not limited to a place in the passage where the moving body 10 performs the cargo handling operations.

As shown in FIG. 2, the movement control device 20 is provided inside the car body 11 of the moving body 10, for example.

Figure 4:
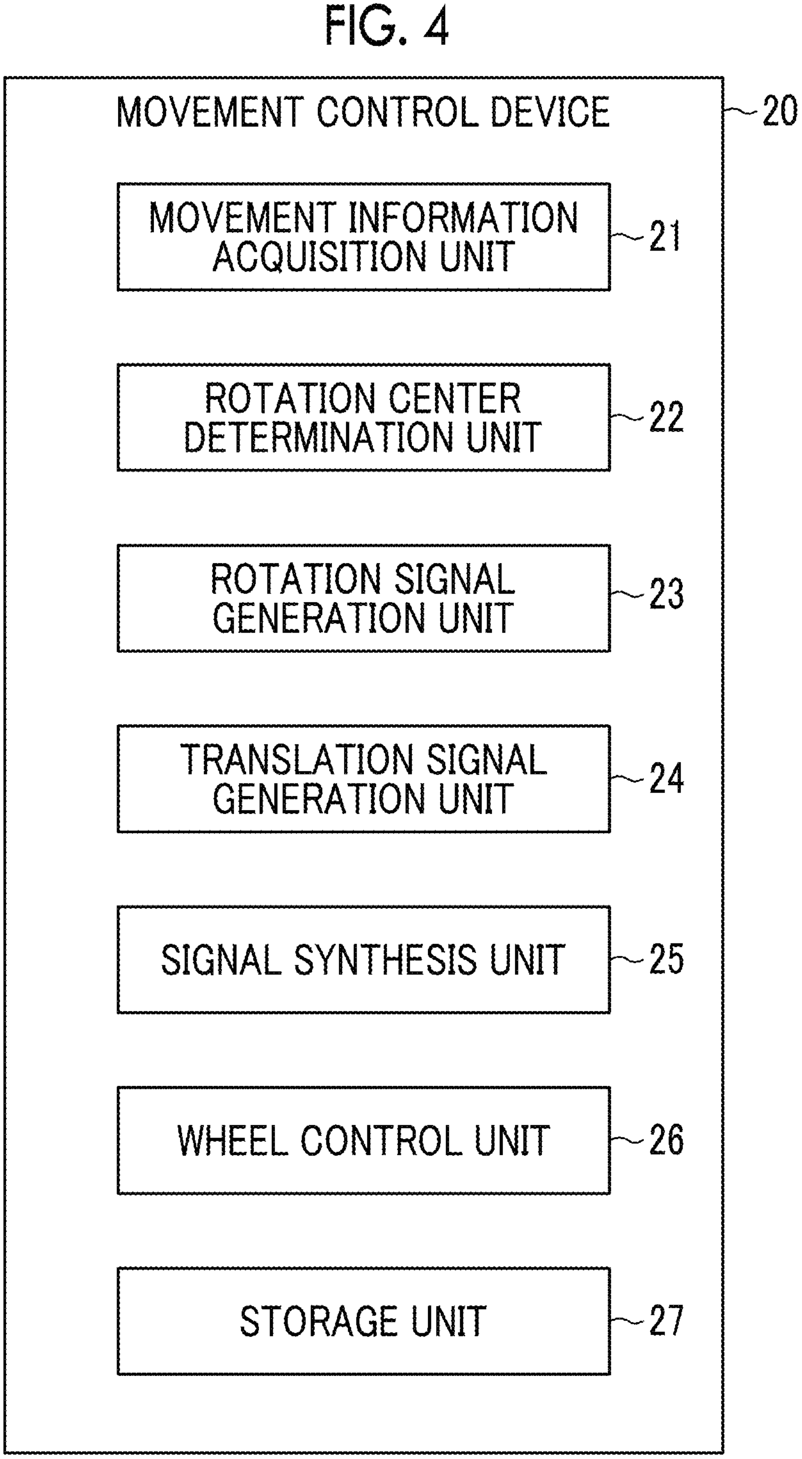
FIG. 4 is a functional block diagram of a movement control device according to the first embodiment of the present disclosure.

As shown in FIG. 4, the movement control device 20 according to the present embodiment includes a movement information acquisition unit 21, a rotation center determination unit 22, a rotation signal generation unit 23, a translation signal generation unit 24, a signal synthesis unit 25, a wheel control unit 26, and a storage unit 27.

(Movement Information Acquisition Unit)

The movement information acquisition unit 21 acquires movement information, which is information related to the movement of the moving body 10, in a case where the moving body 10 arrives at the target position X. The movement information acquired by the movement information acquisition unit 21 according to the present embodiment includes, for example, a target angular velocity of the moving body 10 and a translational velocity of the moving body 10.

The target angular velocity means an angular velocity of the moving body 10 with respect to the rotation center in a view from the upper side Dvu in the vertical direction Dv. Hereinafter, the target angular velocity will be referred to as "ω".

The translational velocity is a speed at which the moving body 10 is moved in one direction intersecting the traveling direction Ds as viewed from the upper side Dvu in the vertical direction Dv. The one direction in the present embodiment matches with the passage width direction D2. Hereinafter, the translational velocity is referred to as "Vr".

The method of acquiring the movement information by the movement information acquisition unit 21 may be any method. The movement information acquisition unit 21 may employ, for example, a predetermined target angular velocity ω and translational velocity Vr stored in advance in the storage unit 27 as the movement information. In addition, the movement information acquisition unit 21 may receive a signal indicating the target angular velocity ω and the translational velocity Vr preset by the host device 30 from the host device 30, and may employ the target angular velocity ω and the translational velocity Vr as the movement information. In addition, the movement information acquisition unit 21 may set the target angular velocity ω and the translational velocity Vr based on, for example, a load applied to the moving body 10 detected by a sensor (for example, a weight sensor) provided in the moving body 10, and may employ the set target angular velocity ω and translational velocity Vr as the movement information. In addition, the movement information is not limited to the above, and may be input one by one, for example, by a remote operation of an operator. In this case, for example, an operator at a position away from the moving body 10 operates an input device for remotely operating the moving body 10. The input device sets the movement information based on the operation content by the operator and transmits the set movement information to the movement information acquisition unit 21 of the movement control device 20.

The movement information acquisition unit 21 transmits the acquired movement information to the rotation signal generation unit 23 and the translation signal generation unit 24.

(Rotation Center Determination Unit)

The rotation center determination unit 22 determines the rotation center of the moving body 10 in a case where the moving body 10 arrives at the target position X. The rotation center determination unit 22 according to the present embodiment determines one of the second rotational axis line O2 about which the second steering motor 152*b* in the traveling mechanism 15 rotates and the third rotational axis line O3 about which the third steering motor 153*b* of the third wheel 153 rotates as the rotation center of the moving body 10.

The method of determining the rotation center of the moving body 10 by the rotation center determination unit 22 may be any method. For example, when the traveling direction Ds of the moving body 10 and the passage extension direction D1 match, in a case where the moving body 10 accesses the pallet placed on the rack of the right wall body W in the view of the passage from the backward side Dsb with the fork 14 (reach out), the rotation center determination unit 22 may determine the second rotational axis line O2 as the rotation center of the moving body 10.

In addition, for example, in a case where the traveling direction Ds of the moving body 10 and the passage extension direction D1 match, and the moving body 10 accesses the pallet placed on the rack of the left wall body W as seen from the backward side Dsb with the fork 14 (reach out), the rotation center determination unit 22 may determine the third rotational axis line O3 as the rotation center of the moving body 10.

Hereinafter, a case where the rotation center determination unit 22 determines the second rotational axis line O2 as the rotation center will be described as an example.

(Rotation Signal Generation Unit)

The rotation signal generation unit 23 generates the rotation signal for controlling each wheel of the traveling mechanism 15 such that the traveling direction Ds of the moving body 10 is changed about the second rotational axis line O2 or the third rotational axis line O3 as a rotation center in a case where the moving body 10 arrives at the target position X.

Specifically, the rotation signal generation unit 23 generates the rotation signal indicating the steering angle of each wheel corresponding to the rotation center and the movement speed of the first wheel body 151*a* based on the target angular velocity ω received from the movement information acquisition unit 21.

For convenience of description, the steering angle of each wheel indicated by the rotation signal will be referred to as a "pre-correction steering angle". The pre-correction steering angle includes a pre-correction steering angle of the first wheel body 151*a*, a pre-correction steering angle of the second wheel body 152*a*, and a pre-correction steering angle of the third wheel body 153*a*.

The pre-correction steering angle of the second wheel body 152*a* that is the rotation center of the moving body 10, that is, the pre-correction steering angle of the second steering motor 152*b*, is set by the rotation signal generation unit 23 such that the second wheel body 152*a* faces the one direction intersecting with the traveling direction Ds.

The pre-correction steering angle of the first wheel body 151*a*, that is, the pre-correction steering angle of the first steering motor 151*b*, is set by the rotation signal generation unit 23 such that the first wheel body 151*a* rotates about the second rotational axis line O2 as a center in a case where the first wheel body 151*a* is rotated together with the drive motor 151*c*, as viewed from the upper side Dvu.

The pre-correction steering angle of the third wheel body 153*a*, that is, the pre-correction steering angle of the third steering motor 153*b*, is set by the rotation signal generation unit 23 such that the third wheel body 153*a* is changed about the second rotational axis line O2 as a center in a case where the first wheel body 151*a* is rotated together with the drive motor 151*c*, as viewed from the upper side Dvu. The third wheel body 153*a* is rotated in conjunction with the rotation of the first wheel body 151*a*.

Here, an example of the pre-correction steering angle will be described using specific numerical values with reference to FIG. 5. In the present example, for ease of description, a case where the traveling direction Ds of the moving body 10 and the passage extension direction D1 match (θ=0°) is illustrated.

In a case where the traveling direction Ds of the moving body 10 as viewed from the upper side Dvu is set to 0°, the pre-correction steering angle of the second wheel body 152*a* is 90° in a clockwise direction as viewed from the upper side Dvu. In addition, the pre-correction steering angle of the first wheel body 151*a* is 270−(θ1/2)° in the clockwise direction in a case where the angle formed by the first virtual line L1 and the second virtual line L2 is defined as "θ1". In addition, the pre-correction steering angle of the third wheel body 153*a* is 180° in the clockwise direction.

The movement speed of the first wheel body 151*a* is obtained by the rotation signal generation unit 23 from the target angular velocity ω as the movement information. Specifically, the rotation signal generation unit 23 can obtain the movement speed of the first wheel body 151*a* by using Expressions (i) and (ii) below. The third wheel body 153*a* moves with the movement of the first wheel body 151*a*.

$$Vx1=\omega\cdot Lt/2 \tag{i}$$

$$Vy1=\omega\cdot Lw \tag{ii}$$

Here, Vx1 represents a speed in the traveling direction Ds among the movement speeds of the first wheel body 151*a*. Vy1 indicates a speed of the first wheel body 151*a* in the car width direction Dw among the movement speeds of the first wheel body 151*a*.

Figure 5:
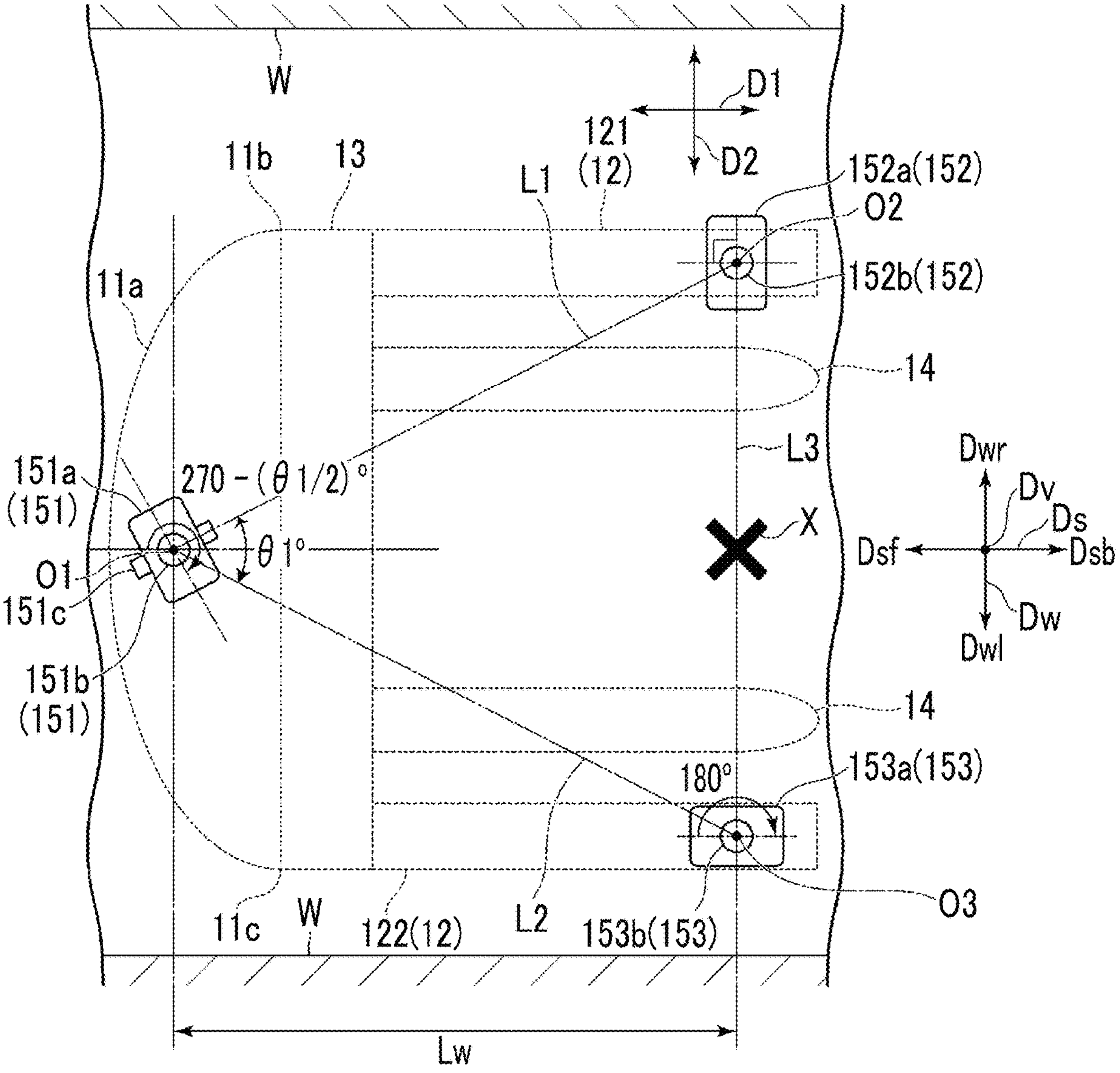
FIG. 5 is a diagram showing an example of a pre-correction steering angle generated by a rotation signal generation unit according to the first embodiment of the present disclosure.

Further, Lw in the above Expression (ii) is the shortest distance between the first rotational axis line O1 shown in FIG. 5 and the third virtual line L3.

The rotation signal generation unit 23 transmits a rotation signal indicating the pre-correction steering angle of each wheel and the movement speeds (Vx1, Vy1) of the first wheel body 151*a* to the signal synthesis unit 25.

(Translation Signal Generation Unit)

In a case where the translation signal generation unit 24 changes the traveling direction Ds of the moving body 10, the translation signal generation unit 24 generates translation signals for controlling each wheel such that one of the second wheel 152 having the second rotational axis line O2 as a rotation center or the third wheel 153 having the third rotational axis line O3 as a rotation center is moved in the one direction.

Specifically, the translation signal generation unit 24 receives the translational velocity Vr for moving each wheel in the one direction from the movement information acquisition unit 21 and generates a translation signal indicating the correction steering angle of each wheel from the translational velocity Vr. Here, the correction steering angle indicates a positive or negative value. Hereinafter, the correction steering angle of the first wheel body 151*a* will be referred to as "α1", and the correction steering angle of the third wheel body 153*a* will be referred to as "α2".

Figure 6:
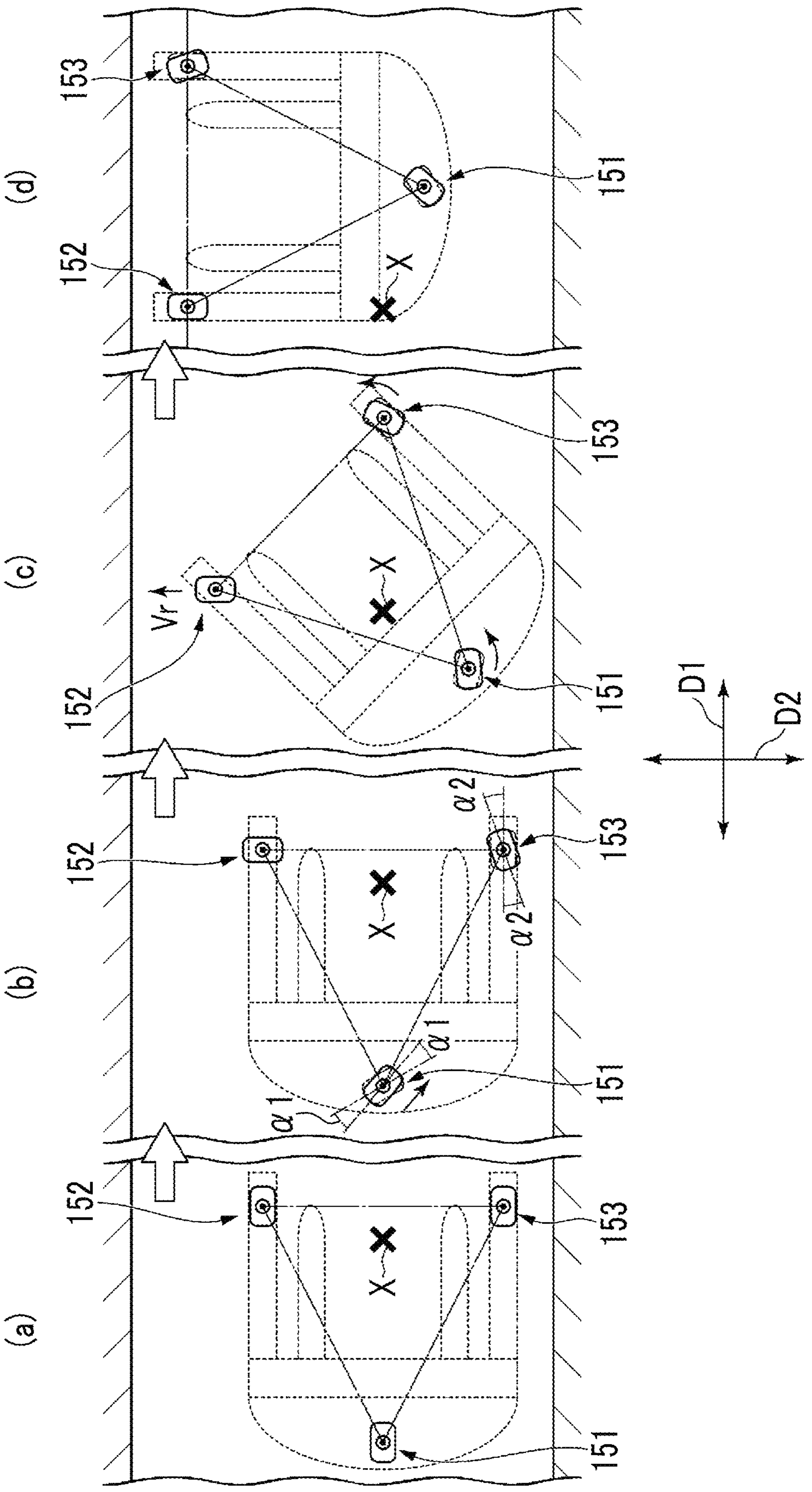
FIG. 6 is a diagram showing a state where the moving body according to the first embodiment of the present disclosure changes a traveling direction at a target position.

By decomposing the translational velocity Vr using Expressions (iii) and (iv) below, the translation signal generation unit 24 can obtain the movement speed of the first wheel body 151*a* for moving the second wheel body 152*a* in the one direction. The third wheel body 153*a* moves at the same movement speed as the movement speed of the first wheel body 151*a*. In FIGS. 5 and 6, a case of θ=0° is shown.

$$Vx2=Vr\cdot\cos(\theta+90°) \tag{iii}$$

$$Vy2=Vr\cdot\sin(\theta+90°) \tag{iv}$$

Here, Vx2 represents a movement speed of the circle in a tangential direction from the first rotational axis line O1 in a case where a radius vector (first virtual line L1) connecting the second rotational axis line O2 and the first rotational axis line O1 as the radius of the circle in a case where the first rotational axis line O1 and the second rotational axis line O2 are viewed from the vertical direction Dv is set as a radius of the circle among the movement speeds of the first wheel body 151*a*. Vy2 indicates a movement speed of the first wheel body 151*a* in the direction in which the above-described radius vector extends, among the movement speeds of the first wheel body 151*a*.

The translation signal generation unit 24 calculates the correction steering angles α1 and α2 of each wheel corresponding to Vx2 and Vy2. Specifically, as illustrated in (b) of FIG. 6, the translation signal generation unit 24 calculates the correction steering angle α1 for the first wheel body 151*a* and the correction steering angle α2 for the third wheel body 153*a* such that the moving body 10 has the velocities Vx2 and Vy2 in the one direction. The translation signal generation unit 24 transmits signals indicating the correction steering angles (α1, α2) of the wheel body (the first wheel body 151*a* and the third wheel body 153*a*) and the movement speeds (Vx2, Vy2) of the first wheel body 151*a* to the signal synthesis unit 25 as translation signals.

(Signal Synthesis Unit)

The signal synthesis unit 25 synthesizes the rotation signal generated by the rotation signal generation unit 23 and the translation signal generated by the translation signal generation unit 24 to generate the wheel control signal. Specifically, the signal synthesis unit 25 calculates the corrected steering angle of the first wheel body 151*a* and the corrected steering angle of the third wheel body 153*a* by synthesizing the vector (Vx1, Vy1) calculated by the rotation signal generation unit 23 and the vector (Vx2, Vy2) calculated by the translation signal generation unit 24.

In addition, the signal synthesis unit 25 calculates the synthetic speed V of the first wheel body 151*a* using Expressions (v) to (vii) below.

$$Vx=Vx1+Vx2 \tag{v}$$

$$Vy=Vy1+Vy2 \tag{vi}$$

$$V=(Vx\hat{}2+Vy\hat{}2)\hat{}1/2 \tag{vii}$$

Here, Vx represents a speed in the traveling direction Ds among the movement speeds of the first wheel body 151*a*. Vy indicates a speed in the car width direction Dw among the movement speeds of the first wheel body 151*a*.

The wheel control signal includes the corrected steering angle of the first wheel body 151*a*, the corrected steering angle of the third wheel body 153*a*, and the synthetic speed V of the first wheel body 151*a*. The signal synthesis unit 25 transmits the wheel control signal to the wheel control unit 26.

(Wheel Control Unit)

The wheel control unit 26 controls each wheel based on the wheel control signal generated by the signal synthesis unit 25. Specifically, the wheel control unit 26 transmits a signal indicating an instruction for driving the first steering motor 151*b* such that the first wheel body 151*a* is set to the corrected steering angle. In addition, the wheel control unit 26 transmits a signal indicating the instruction of the driving to the second steering motor 152*b* such that the second wheel 152 is at the pre-correction steering angle. In addition, the wheel control unit 26 transmits a signal indicating an instruction to the third steering motor 153*b* to drive the third wheel 153 to be at the corrected steering angle.

The wheel control unit 26 transmits a signal indicating an instruction of driving the first wheel body 151*a* to move at a synthetic speed V to the drive motor 151*c* after the first wheel body 151*a*, the second wheel body 152*a*, and the third wheel body 153*a* indicate the corrected steering angle.

By performing the above control, the wheel control unit 26 moves the second wheel body 152*a* in the one direction while maintaining the rotation angle as shown in (b) to (d) in FIG. 6. At the same time, the first wheel body 151*a* and the third wheel body 153*a* revolve about the second rotational axis line O2. Therefore, the moving body 10 moves in one direction (passage width direction D2) while changing the traveling direction Ds about the second rotational axis line O2.

(Operation of Movement Control Device)

Figure 7:
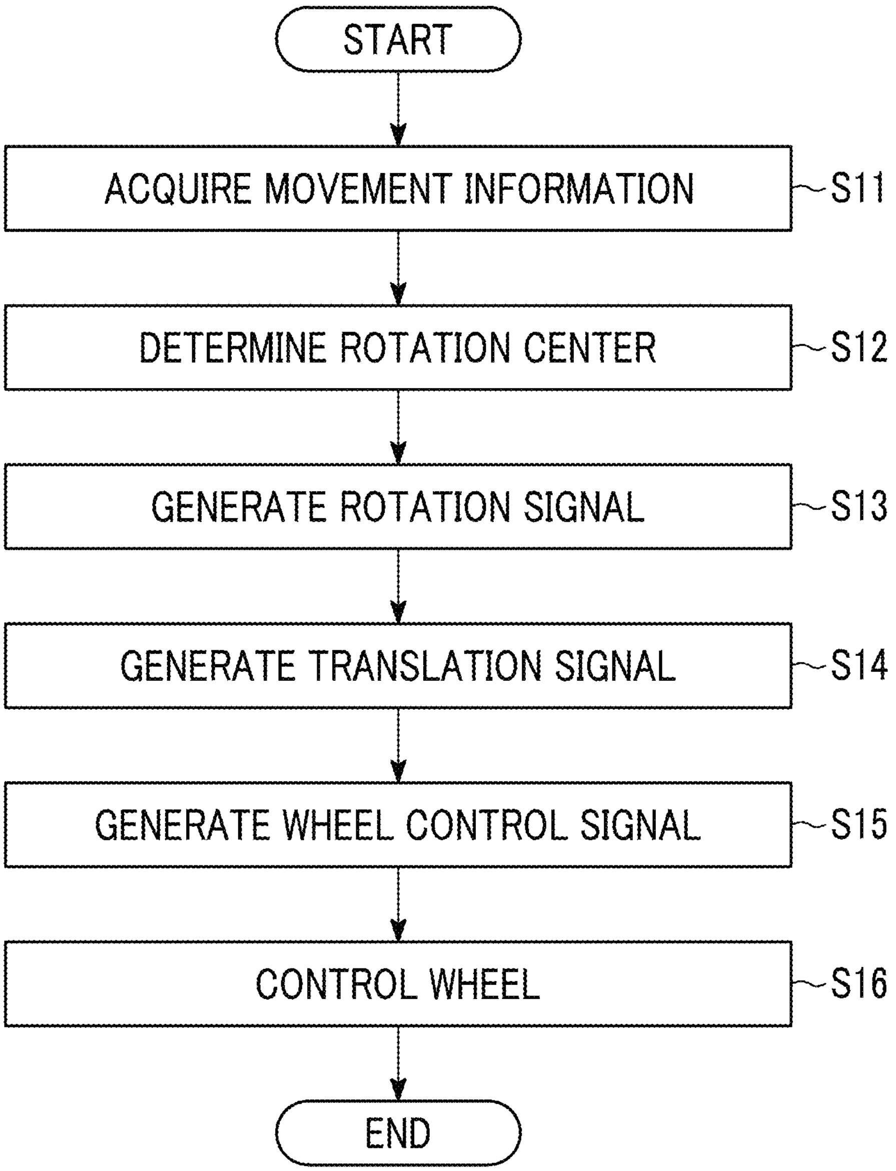
FIG. 7 is a flowchart illustrating an operation of the movement control device according to the first embodiment of the present disclosure.

Subsequently, an example of the operation of the movement control device 20 according to the present embodiment will be described with reference to FIG. 7.

The movement information acquisition unit 21 acquires the movement information, which is information related to the movement of the moving body 10, in a case where the moving body 10 arrives at the target position X (step S11).

Next, in a case where the moving body 10 arrives at the target position X, the rotation center determination unit 22 determines the rotation center of the moving body 10 (step S12). The rotation center determination unit 22 determines one of the second rotational axis line O2 about which the second steering motor 152*b* serves as a rotation center and the third rotational axis line O3 about which the third steering motor 153*b* of the third wheel 153 serves as a rotation center as the rotation center of the moving body 10. The order of the processing of steps S12 and S11 may be reversed. In addition, the processing of step S12 and the processing of step S11 may be performed in parallel.

Next, in a case where the moving body 10 arrives at the target position X, the rotation signal generation unit 23 generates the rotation signal for controlling each wheel of the traveling mechanism 15 such that the traveling direction Ds of the moving body 10 is changed with the rotational axis line (the second rotational axis line O2 or the third rotational axis line O3) determined by the rotation center determination unit 22 as the rotation center (step S13).

Next, in a case where the translation signal generation unit 24 changes the traveling direction Ds of the moving body 10, the translation signal generation unit 24 generates translation signals for controlling each wheel such that the wheels (the second wheel 152 or the third wheel 153) having the rotational axis line (the second rotational axis line O2 or the third rotational axis line O3) determined by the rotation center determination unit 22 as the rotation center are moved in one direction (step S14).

The order of the processing of step S14 and step S13 may be reversed. In addition, the processing of step S14 and the processing of step S13 may be performed in parallel.

Next, the signal synthesis unit 25 synthesizes the rotation signal generated by the rotation signal generation unit 23 and the translation signal generated by the translation signal generation unit 24 to generate the wheel control signal (step S15).

Next, the wheel control unit 26 controls each wheel based on the wheel control signal generated by the signal synthesis unit 25 (step S16).

The processes of steps S11 to S16 described above are repeatedly executed while the moving body 10 is driven (while the movement control system 1 is operated).

(Movement Control Method)

Figure 8:
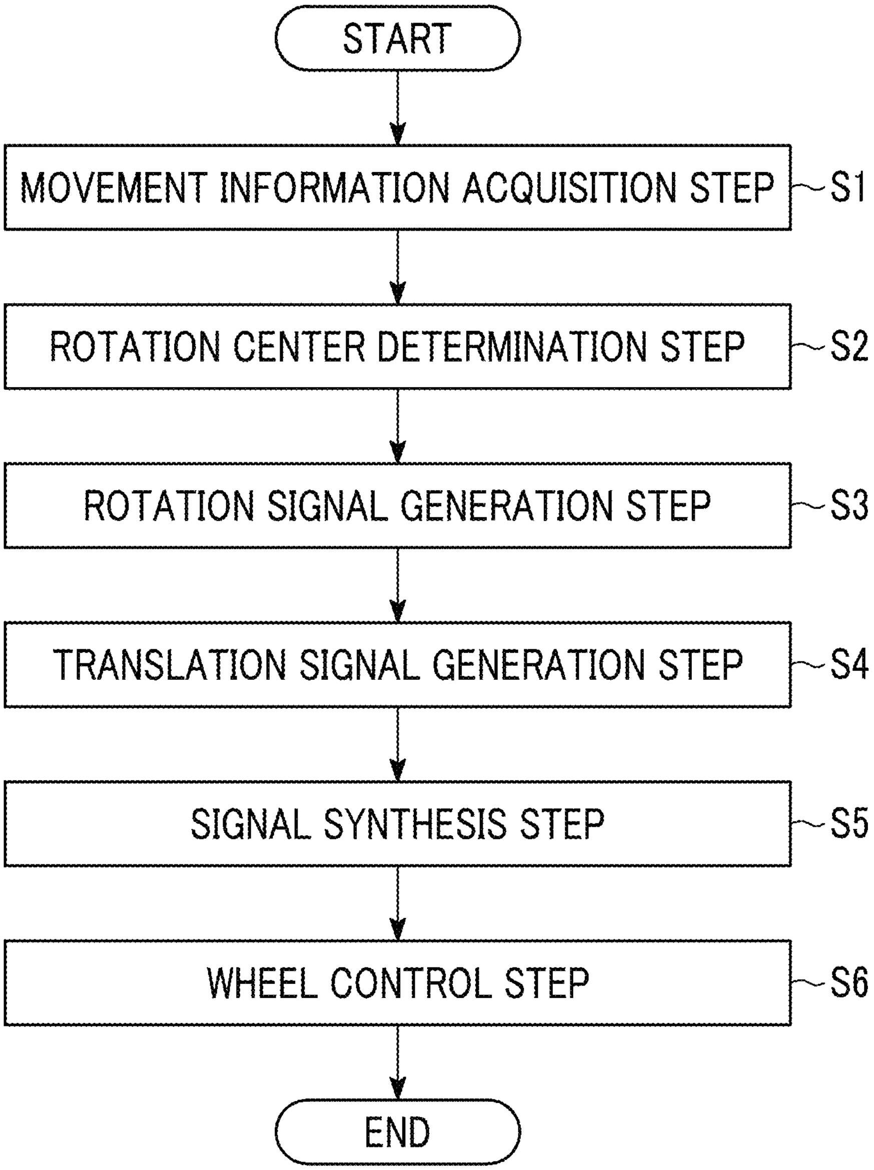
FIG. 8 is a flowchart illustrating a movement control method according to the first embodiment of the present disclosure.

As shown in FIG. 8, a movement control method according to the present embodiment executes a movement information acquisition step S1, a rotation center determination step S2, a rotation signal generation step S3, a translation signal generation step S4, a signal synthesis step S5, and a wheel control step S6.

(Movement Information Acquisition Step)

The movement information acquisition step S1 is a step of acquiring the movement information, which is information on the movement of the moving body 10, in a case where the moving body 10 arrives at the target position X. The movement information acquired in the movement information acquisition step S1 includes the target angular velocity ω of the moving body 10 and the translational velocity Vr of the moving body 10.

(Rotation Center Determination Step)

The rotation center determination step S2 is a step executed after the movement information acquisition step S1. In the rotation center determination step S2, in a case where the moving body 10 arrives at the target position X, the rotation center of the moving body 10 is determined. In the rotation center determination step S2, one of the second rotational axis line O2 about which the second steering motor 152*b* in the traveling mechanism 15 is the rotation center and the third rotational axis line O3 about which the third steering motor 153*b* of the third wheel 153 is the rotation center is determined as the rotation center of the moving body 10.

The order of the rotation center determination step S2 and the movement information acquisition step S1 may be reversed. In addition, the rotation center determination step S2 and the movement information acquisition step S1 may be performed in parallel.

(Rotation Signal Generation Step)

The rotation signal generation step S3 is a step executed after the rotation center determination step S2. In the rotation signal generation step S3, in a case where the moving body 10 arrives at the target position X, a rotation signal for controlling each wheel of the traveling mechanism 15 is generated such that the traveling direction Ds of the moving body 10 is changed to the second rotational axis line O2 or the third rotational axis line O3 determined in the rotation center determination step S2 as a rotation center.

(Translation Signal Generation Step)

The translation signal generation step S4 is a step executed after the rotation signal generation step S3. In the translation signal generation step S4, in a case where the traveling direction Ds of the moving body 10 is to be changed, translation signals for controlling each wheel are generated such that the wheels having the rotational axis line determined in the rotation center determination step S2 as the rotation center are moved in one direction.

The order of the translation signal generation step S4 and the rotation signal generation step S3 may be reversed. In addition, the translation signal generation step S4 and the rotation signal generation step S3 may be performed in parallel.

(Signal Synthesis Step)

The signal synthesis step S5 is a step executed after the translation signal generation step S4. In the signal synthesis step S5, the rotation signal generated in the rotation signal generation step S3 and the translation signal generated in the translation signal generation step S4 are synthesized to generate the wheel control signal.

(Wheel Control Step)

The wheel control step S6 is a step executed after the signal synthesis step S5. In the wheel control step S6, each wheel is controlled based on the wheel control signal generated in the signal synthesis step S5.

(Operations and Effects)

According to the above, since the vehicle control signal for controlling the wheel of the moving body 10 is formed by synthesizing the rotation signal and the translation signal, the traveling direction Ds of the moving body 10 is changed to the rotation center of the second wheel 152 or the third wheel 153, and the moving body 10 moves in one direction intersecting the traveling direction Ds. Thereby, for example, the moving body 10 can be prevented from colliding with another interference object as compared with a case in which the moving body 10 changes the traveling direction Ds without moving in one direction. As a result, it is possible to smoothly change the traveling direction Ds of the moving body 10 provided with the wheel having the simpler configuration even in the narrow passage.

In addition, since the second wheel 152 or the third wheel 153 that is the rotation center is moved in only one direction, for example, it is possible to suppress the occurrence of wear or the like on the second wheel 152 or the third wheel 153 as compared with a case in which a steering angle or the like of the second wheel 152 or the third wheel 153 is changed (cutting) during the switching of the traveling direction Ds of the moving body 10.

In addition, according to the above, since the one direction intersecting the traveling direction Ds matches the passage width direction D2, in a case in which the moving body 10 changes in the traveling direction Ds in the passage, the second wheel 152 or the third wheel 153 as the rotation center does not move in the direction in which the passage extends. Accordingly, for example, in a case where the moving body 10 changes the traveling direction Ds, the distance by which the moving body 10 moves in the direction in which the passage extends can be suppressed, as compared with a case where the second wheel 152 or the third wheel 153 moves in a direction other than the passage width direction D2. As a result, it is possible to more smoothly change the traveling direction Ds of the moving body 10.

In addition, according to the above, since the front surface 11*a* of the car body 11 that extends over the end edge 11*b* on the one side Dwr and the end edge 11*c* on the other side Dwl of the car body 11 and that faces the forward side Dsf of the car body 11 forms a convex curved surface, for example, the end edges 11*b* and 11*c* are recessed on the backward side Dsb as compared with a case in which the front surface 11*a* is a flat surface. Therefore, in a case where the traveling direction Ds of the moving body 10 is changed in the passage, it is possible to prevent the front surface 11*a* of the car body 11 from colliding with the wall body W of the passage.

Second Embodiment

Next, a second embodiment of the movement control system 1 and the movement control method according to the present disclosure will be described with reference to FIGS. 9 to 13. In the second embodiment described below, the same reference numerals will be assigned to configurations common to those of the above-described first embodiment in the drawings, and description thereof will be omitted.

(Moving Body)

Figure 9:
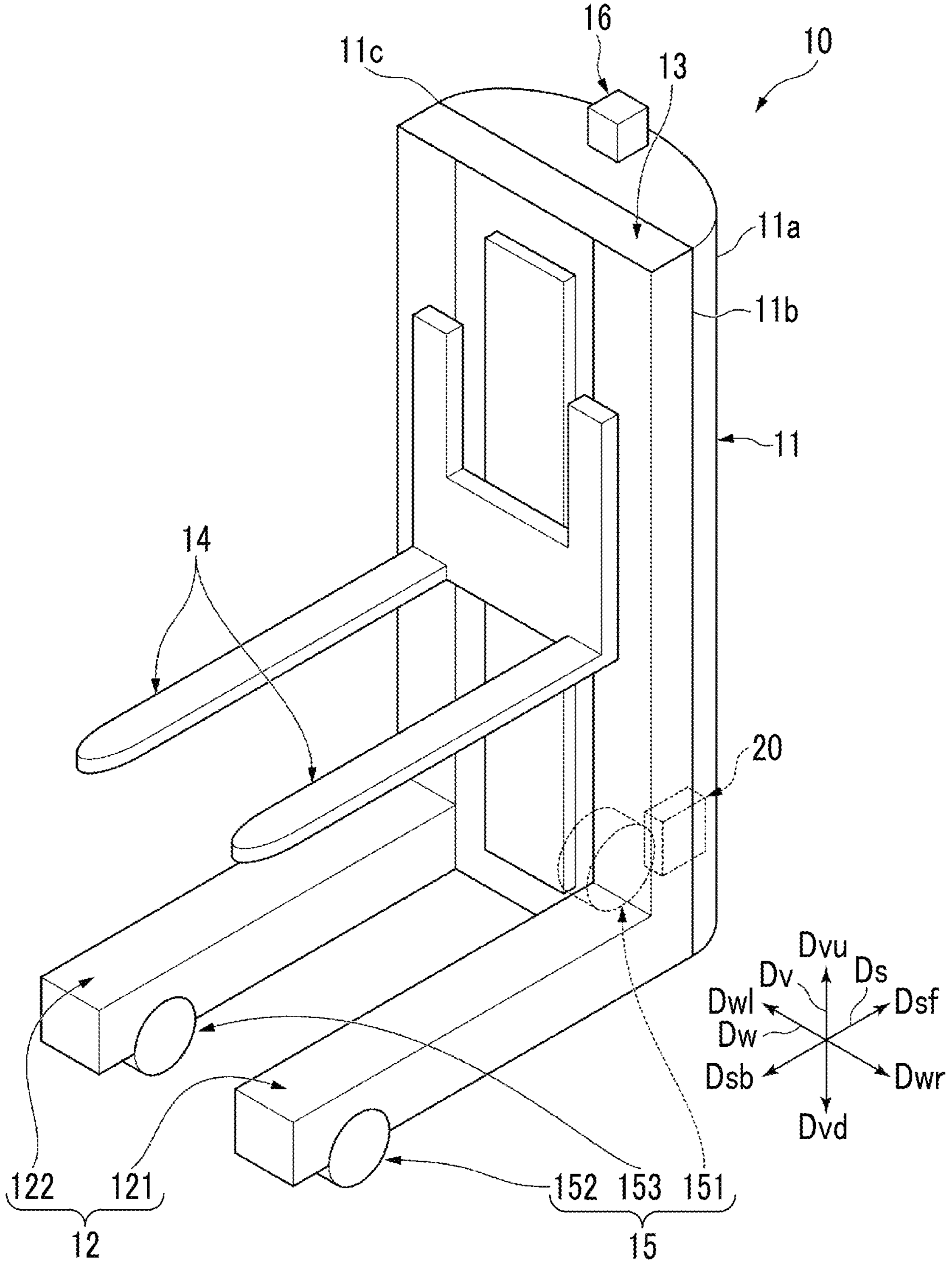
FIG. 9 is a perspective view showing a configuration of a moving body according to a second embodiment of the present disclosure.

As shown in FIG. 9, the moving body 10 according to the present embodiment includes a car body 11, a straddle leg 12, a mast 13, a fork 14, a traveling mechanism 15, and a sensor 16.

(Sensor)

The sensor 16 detects a position and a posture of an object by irradiating the periphery with laser light and detecting (receiving) reflected light from the object in the periphery. The sensor 16 is a laser scanner that scans the laser light in a horizontal direction. The sensor 16 according to the present embodiment is a two-dimensional light detection and ranging (2D-LiDAR). The sensor 16 is provided on, for example, a surface of the car body 11 facing the upper side Dvu.

Figure 10:
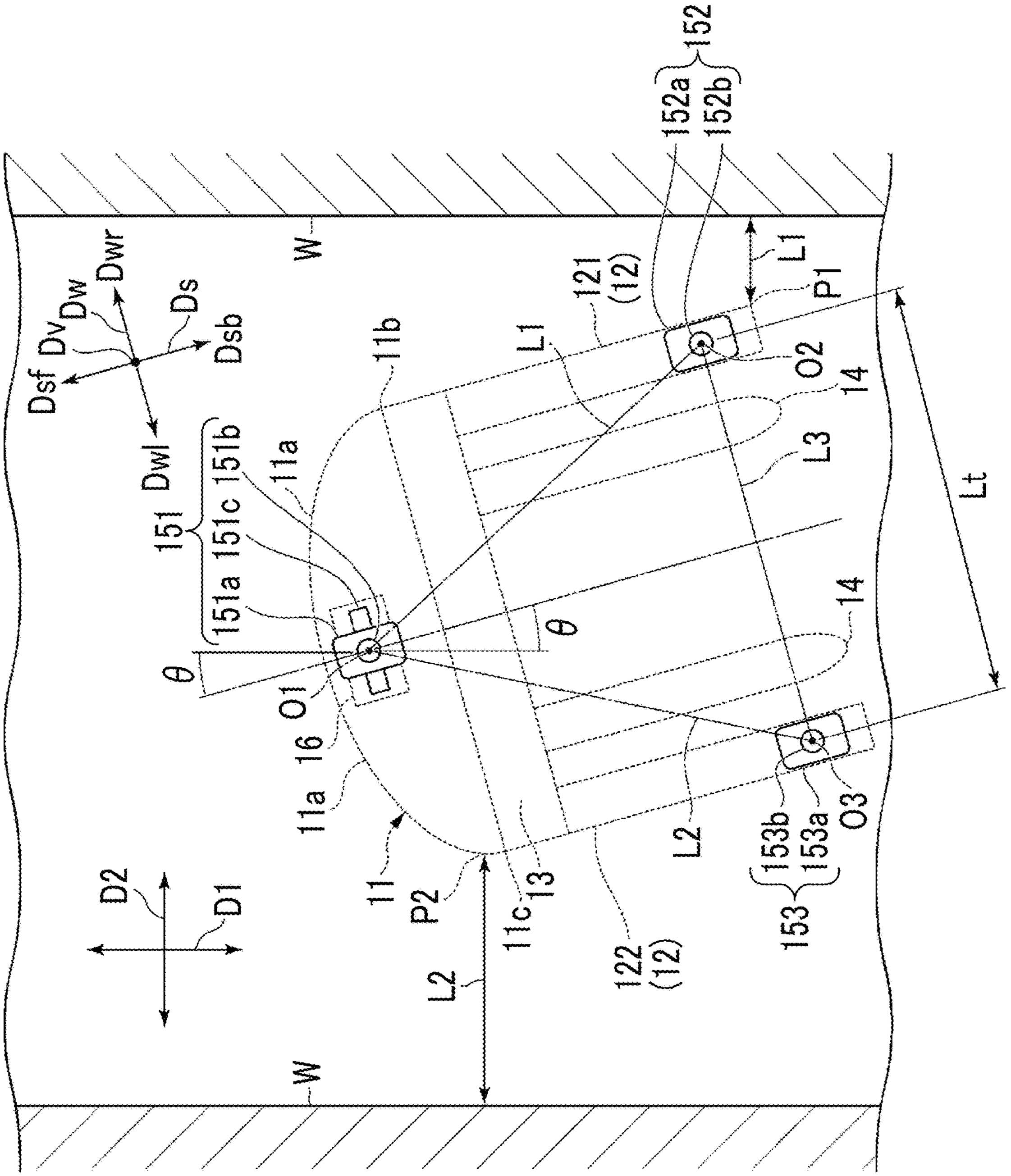
FIG. 10 is a diagram showing a traveling mechanism according to the second embodiment of the present disclosure as viewed from an upper side.

As shown in FIG. 10, in a case where the moving body 10 moves in the passage, the sensor 16 detects the contours of the pair of wall bodies W and the contour of the moving body 10 by scanning the laser light in the horizontal direction. Specifically, the sensor 16 acquires data indicating the contour of the wall body W through a plurality of plots. Each plot of the data indicating the contour of the wall body W is associated with coordinates of a two-dimensional plane coordinate system.

In addition, the sensor 16 detects a first portion P1 closest to one wall body W in the moving body 10 and a second portion P2 closest to the other wall body W in the moving body 10. Specifically, the sensor 16 acquires data indicating the contour of the moving body 10 through a plurality of plots. The coordinates of a two-dimensional plane coordinate system are associated with each plot of the data indicating the contour of the moving body 10. The sensor 16 transmits the acquired contour data of the wall body W and the contour data of the moving body 10 including the first portion P1 and the second portion P2 to a movement control device 20*a*.

(Movement Control Device)

Figure 11:
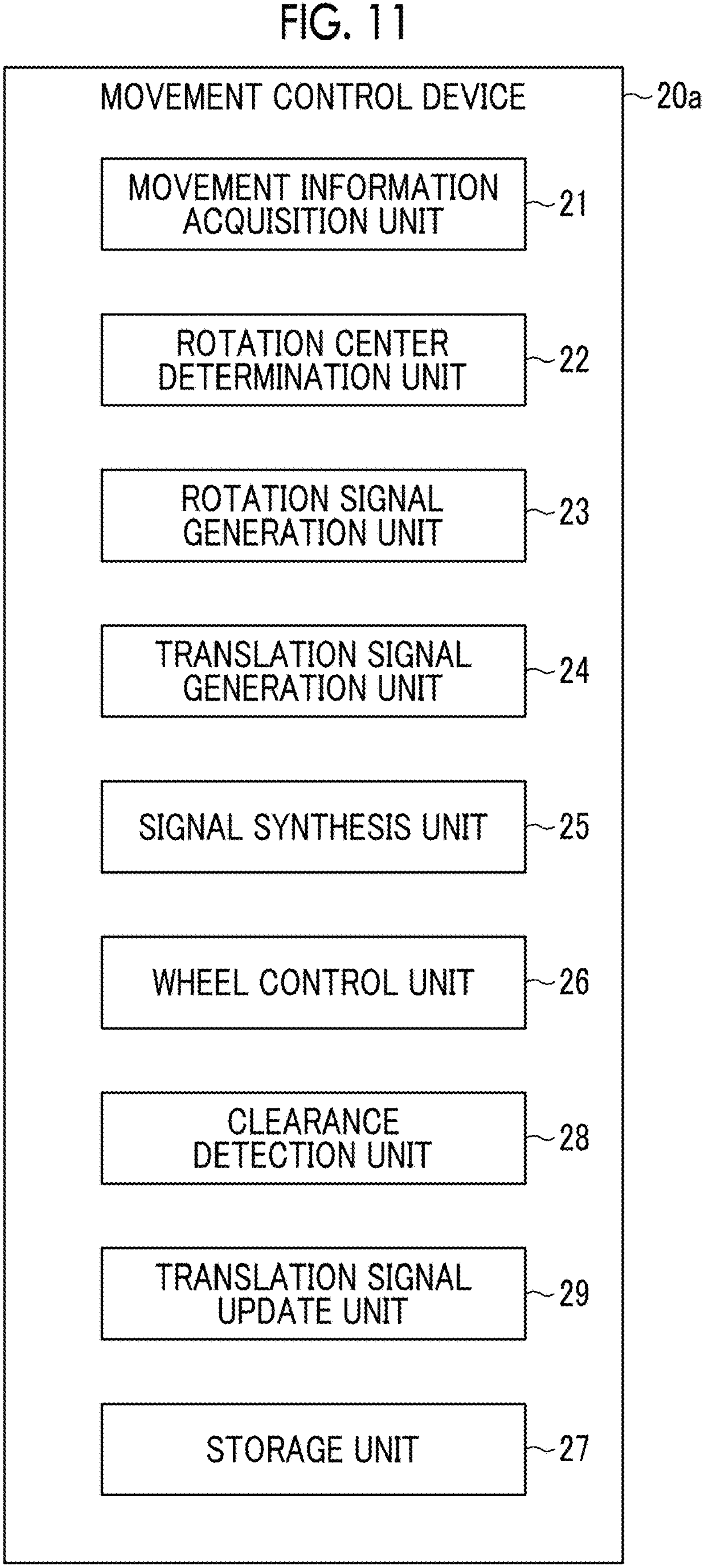
FIG. 11 is a functional block diagram of a movement control device according to the second embodiment of the present disclosure.

As shown in FIG. 11, the movement control device 20*a* according to the present embodiment includes a movement information acquisition unit 21, a rotation center determination unit 22, a rotation signal generation unit 23, a translation signal generation unit 24, a signal synthesis unit 25, a wheel control unit 26, a clearance detection unit 28, a translation signal update unit 29, and a storage unit 27.

(Clearance Detection Unit)

The clearance detection unit 28 detects a clearance between the wall body W on one side of the pair of wall bodies W and the moving body 10, and a clearance between the wall body W on the other side of the pair of wall bodies W and the moving body 10. In the present embodiment, the clearance detection unit 28 detects a first clearance L1, which is a distance between the wall body W on one side and the first portion P1 in the moving body 10, and a second clearance L2, which is a distance between the wall body W on the other side and the second portion P2 in the moving body 10, from the sensor 16.

(Translation Signal Update Unit)

The translation signal update unit 29 updates the translation signal generated by the translation signal generation unit 24 such that a difference between the first clearance L1 and the second clearance L2 is small, based on the first clearance L1 and the second clearance L2 detected by the clearance detection unit 28.

The translation signal update unit 29 according to the present embodiment generates a translational velocity Vr' based on the first clearance L1 and the second clearance L2, which are used instead of the translational velocity Vr used in a case where the translational velocity Vr of each wheel body is generated. The translation signal update unit 29 calculates the translational velocity Vr' using Expression (viii) below.

$$Vr' = k \cdot (L1 - L2) \tag{viii}$$

Here, k represents, for example, a gain (parameter for controlling) having a predetermined size determined by the specification of the sensor 16, the dimension of the passage in the width direction, and the like. The translation signal update unit 29 updates the translation signal generated by the translation signal generation unit 24 by transmitting the generated translational velocity to the translation signal generation unit 24.

(Operation of Movement Control Device)

Figure 12:
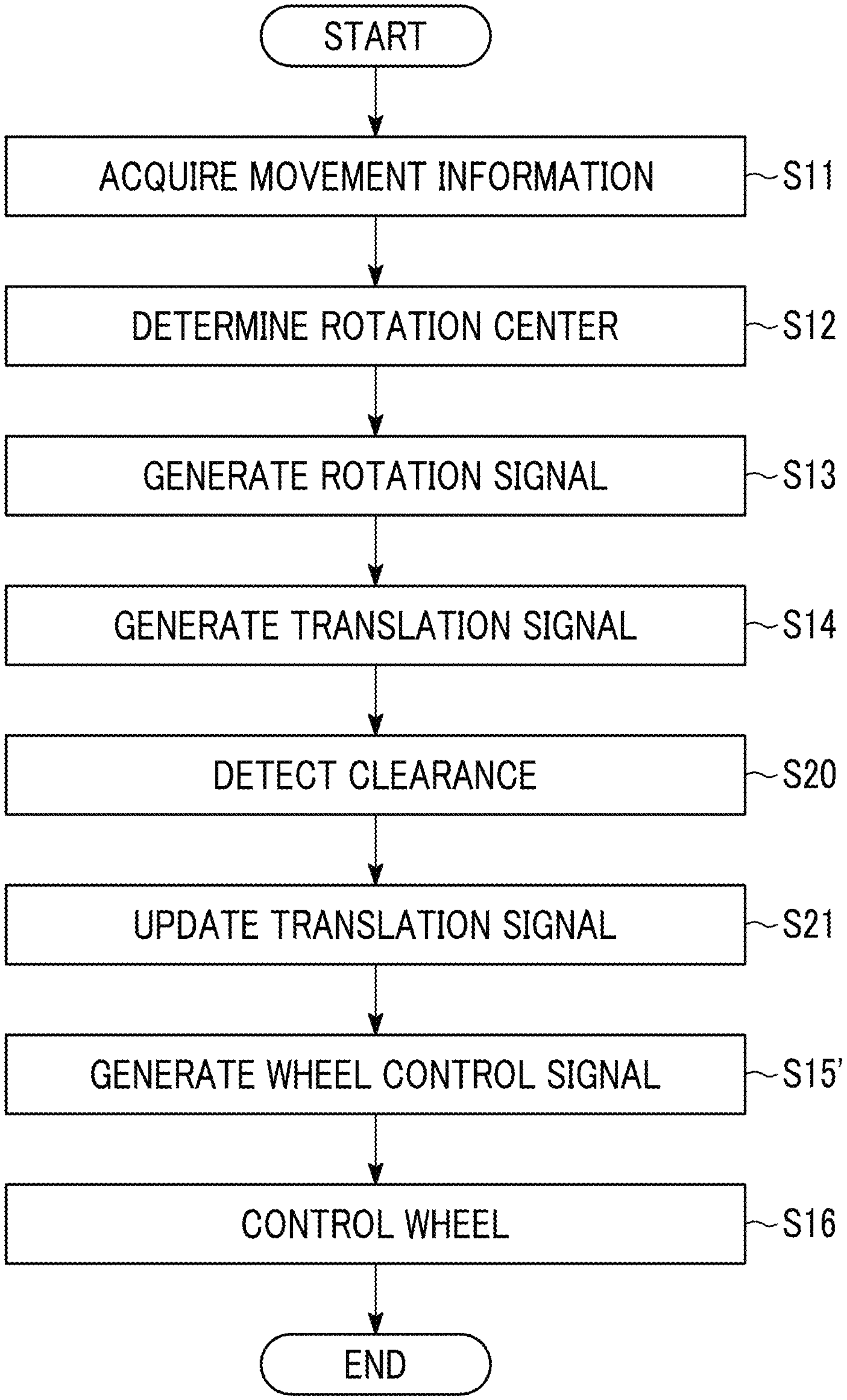
FIG. 12 is a flowchart illustrating an operation of the movement control device according to the second embodiment of the present disclosure.

Subsequently, an example of the operation of the movement control device 20*a* according to the present embodiment will be described with reference to FIG. 12. Steps S11 to S14 and step S16 are the same as the processes described in the first embodiment.

Next, in step S14, the clearance detection unit 28 detects the first clearance L1 between the wall body W on one side of the pair of wall bodies W and the moving body 10, and the clearance L2 between the wall body W on the other side of the pair of wall bodies W and the moving body 10 (step S20).

Note that step S20 may be performed between the processes before step S14. In addition, step S20 may be performed first. In addition, the processing of step S20 and the processing before step S14 may be performed in parallel.

Next, the translation signal update unit 29 updates the translation signal generated by the translation signal generation unit 24 such that a difference between the first clearance L1 and the second clearance L2 is reduced, based on the first clearance L1 and the second clearance L2 detected by the clearance detection unit 28 (step S21).

Next, the signal synthesis unit 25 synthesizes the rotation signal generated by the rotation signal generation unit 23 with the translation signal updated by the translation signal update unit 29 to generate the wheel control signal (step S15').

The processes of steps S11 to S14, step S16, step S20, step S21, and step S15' described above are repeatedly executed while the moving body 10 is driven (while the movement control system 1 is in operation).

(Movement Control Method)

Figure 13:
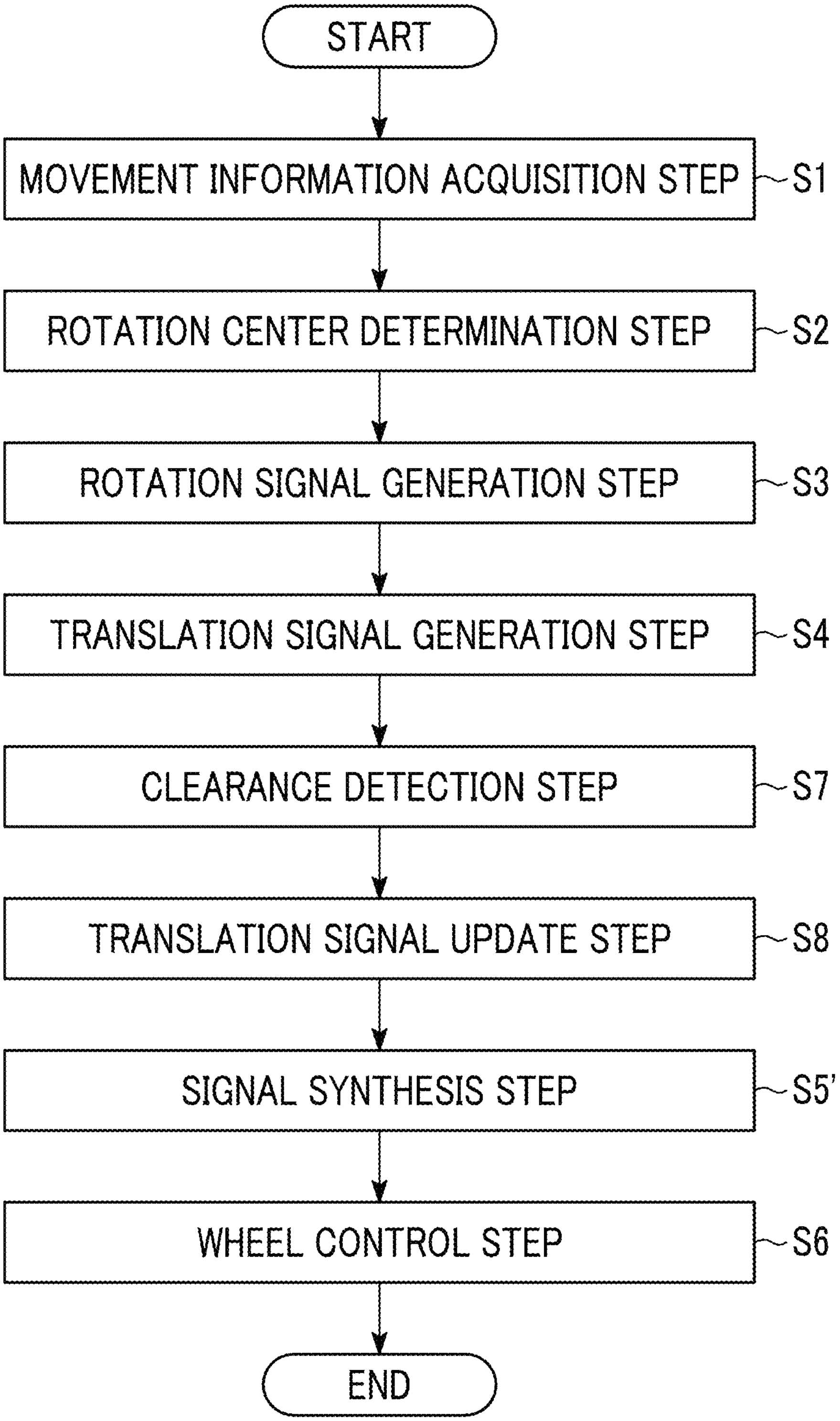
FIG. 13 is a flowchart illustrating a movement control method according to the second embodiment of the present disclosure.

As shown in FIG. 13, the movement control method according to the present embodiment executes a movement information acquisition step S1, a rotation center determination step S2, a rotation signal generation step S3, a translation signal generation step S4, a signal synthesis step S5', a wheel control step S6, a clearance detection step S7, and a translation signal update step S8.

The movement information acquisition step S1, the rotation center determination step S2, the rotation signal generation step S3, the translation signal generation step S4, and the wheel control step S6 are the same as the respective steps described in the first embodiment.

(Clearance Detection Step)

The clearance detection step S7 is a step performed subsequent to the translation signal generation step S4. In the clearance detection step S7, the clearance between the wall body W on one side of the pair of wall bodies W and the moving body 10 and the clearance between the wall body W on the other side of the pair of wall bodies W and the moving body 10 are detected.

The clearance detection step S7 may be performed between the steps before the translation signal generation step S4. In addition, the clearance detection step S7 may be performed first. In addition, the clearance detection step S7 and the steps before the translation signal generation step S4 may be performed in parallel.

(Translation Signal Update Step)

The translation signal update step S8 is a step performed subsequent to the clearance detection step S7. In the translation signal update step S8, the translation signal generated in the translation signal generation step S4 is updated such that a difference between the first clearance L1 and the second clearance L2 is reduced based on the first clearance L1 and the second clearance L2 detected in the clearance detection step S7.

(Operations and Effects)

According to the above, the clearance detection step S7 detects the first clearance L1 and the second clearance L2, which are the distances between the moving body 10 and the pair of wall bodies W, based on the data detected by the sensor 16, so that the bias (difference) of the position of the moving body 10 in the width direction of the passage to one wall body W is determined. Further, the translation signal update step S8 updates the translational velocity such that the difference between the first clearance L1 and the second clearance L2 is smaller based on the bias. Therefore, the position of the moving body 10 can be brought close to a center side in the passage width direction D2, and as a result, it is possible to prevent the moving body 10 from colliding with the wall body W.

Other Embodiments

The embodiment of the present disclosure has been described in detail above with reference to the drawings. However, a specific configuration is not limited to the configuration of the embodiment, and additions, omissions, and substitutions of components and other modifications can be made without departing from the scope of the present disclosure.

Figure 14:
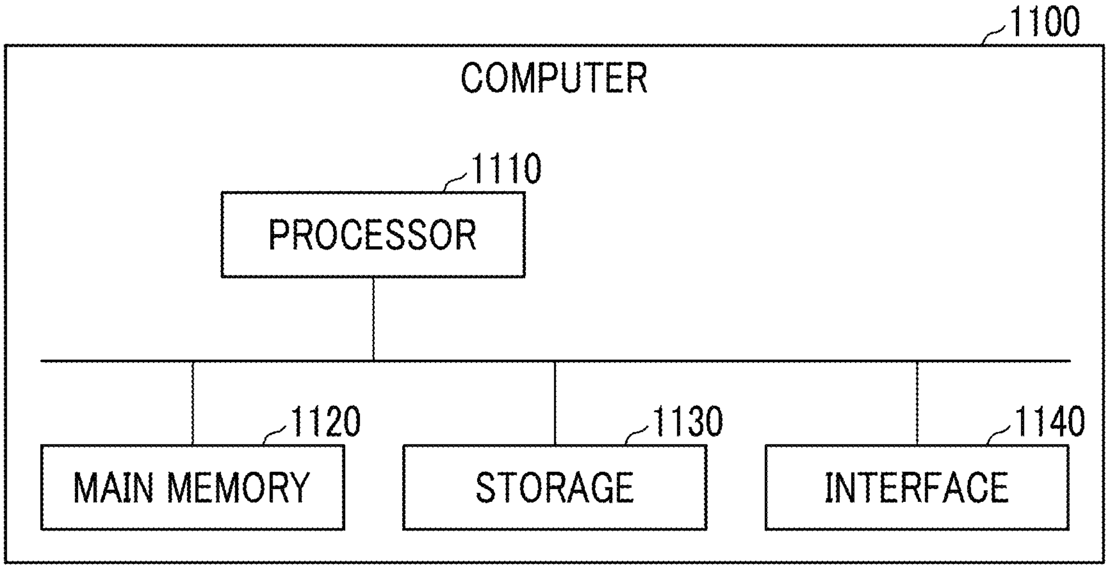
FIG. 14 is a hardware configuration diagram showing a configuration of a computer according to the embodiment of the present disclosure.

FIG. 14 is a hardware configuration diagram showing a configuration of a computer 1100 according to the present embodiment.

A computer 1100 includes a processor 1110, a main memory 1120, a storage 1130, and an interface 1140.

The movement control devices 20 and 20*a* described above are implemented in the computer 1100. An operation of each of the processing units described above is stored in the storage 1130 in a form of a program. The processor 1110 reads the program from the storage 1130, deploys the read program in the main memory 1120, and executes the above-described process in accordance with the program. Further, the processor 1110 allocates a storage area corresponding to each storage unit 27 described above in the main memory 1120 in accordance with the program.

The program may be a program for realizing some functions performed by the computer 1100. For example, the program may exhibit the function in combination with another program already stored in the storage 1130 or in combination with another program implemented in another device.

In addition, the computer 1100 may include a custom large-scale integrated circuit (LSI) such as a programmable logic device (PLD) in addition to or in place of the above configuration. Examples of the PLDs include a programmable array logic (PAL), a generic array logic (GAL), a complex programmable logic device (CPLD), and a field-programmable gate array (FPGA). In this case, some or all of the functions realized by the processor 1110 may be realized by the integrated circuit.

As an example of the storage 1130, a magnetic disk, a magneto-optical disk, or a semiconductor memory can be used. The storage 1130 may be an internal medium directly connected to a bus of the computer 1100 or may be an external medium connected to the computer 1100 through the interface 1140 or a communication line.

In addition, when this program is distributed to the computer 1100 via the communication line, the computer 1100 receiving the distributed program may deploy the program in the main memory 1120 to execute the above-described process. In the above-described embodiment, the storage 1130 is a non-transitory tangible storage medium.

In addition, the program may be a program for realizing some of the above-described functions. Furthermore, the program may be a so-called difference file (difference program) that realizes the above-described functions in combination with another program previously stored in the storage 1130.

In addition, the second wheel 152 described in the above embodiment may further include a drive motor 151*c* that rotates the second wheel body 152*a* in a state of being in contact with the road surface. In addition, the third wheel 153 may further include a drive motor 151*c* that rotates the third wheel body 153*a* in a state of being in contact with the road surface. Accordingly, the second wheel 152 and the third wheel 153 may be drivable and steerable.

In addition, in the embodiment described above, the configuration has been described in which the triangle consisting of the first virtual line L1, the second virtual line L2, and the third virtual line L3 has an equilateral triangle shape as viewed from the vertical direction Dv, but the present disclosure is not limited to this. For example, the first virtual line L1, the second virtual line L2, and the third virtual line L3 may form an equilateral triangle having the same length.

In addition, the configuration of the movement control system 1 described in each of the above embodiments is not limited to the independent configuration, and the movement control system 1 may be configured by appropriately combining the components described in each embodiment.

Additional Notes

The movement control device, the movement control system, the movement control method, and the program described in each embodiment are understood, for example, as follows.

(1) A movement control device 20 or 20*a* according to a first aspect is a movement control device 20 or 20*a* that controls each wheel of a moving body 10 having a first wheel 151 that is drivable and steerable, a second wheel 152 that is steerable, and a third wheel 153 that is steerable, the movement control device 20 or 20*a* including: a rotation signal generation unit 23 that generates a rotation signal for controlling each wheel such that a traveling direction Ds of the moving body 10 is changed with one of the second wheel 152 or the third wheel 153 as a rotation center when viewed from a vertical direction Dv; a translation signal generation unit 24 that generates a translation signal for controlling each wheel such that one of the second wheel 152 and the third wheel 153 as the rotation center is moved in one direction intersecting the traveling direction Ds in a case where the traveling direction Ds of the moving body 10 is changed; a signal synthesis unit 25 that generates a wheel control signal obtained by synthesizing the rotation signal and the translation signal; and a wheel control unit 26 that controls each wheel based on the wheel control signal.

Thereby, it is possible to prevent the moving body 10 from colliding with another interference object as compared with a case in which the moving body 10 changes the traveling direction Ds without moving in one direction. In addition, since the wheel that is the rotation center moves in one direction, it is possible to suppress the progress of wear or the like of the wheel that is the rotation center as compared with a case where the wheel that is the rotation center changes the steering angle during the turning of the moving body 10.

(2) The movement control devices 20 and 20*a* according to the second aspect are the movement control devices 20 and 20*a* according to (1), in which, in a case where the moving body 10 moves in a passage between a pair of wall bodies W facing each other, the one direction matches a width direction of the passage.

Accordingly, in a case where the moving body 10 changes the traveling direction Ds in the passage, the wheel as the rotation center does not move in the direction in which the passage extends.

(3) The movement control device 20*a* according to a third aspect is the movement control device 20*a* according to (2), further including: a clearance detection unit 28 that detects a first clearance L1 between one wall body W of the pair of wall bodies W and the moving body 10 and a second clearance L2 between the other wall body W of the pair of wall bodies W and the moving body 10; and a translation signal update unit 29 that updates the translation signal generated by the translation signal generation unit 24 such that a difference between the first clearance L1 and the second clearance L2 is reduced, based on the first clearance L1 and the second clearance L2 detected by the clearance detection unit 28.

The position of the moving body 10 can be brought close to the center side in the width direction of the passage, and as a result, it is possible to prevent the moving body 10 from colliding with the wall body W.

(4) A movement control system according to a fourth aspect includes: the moving body 10; and the movement control device 20 or 20*a* according to any one of (1) to (3).

(5) A movement control method according to a fifth aspect is a movement control method of controlling each wheel of a moving body 10 having a first wheel 151 that is drivable and steerable, a second wheel 152 that is steerable, and a third wheel 153 that is steerable, the movement control method including: a rotation signal generation step S3 of generating a rotation signal for controlling each wheel such that a traveling direction Ds of the moving body 10 is changed with one of the second wheel 152 or the third wheel 153 as a rotation center when viewed from a vertical direction Dv; a translation signal generation step S4 of generating a translation signal for controlling each wheel such that one of the second wheel 152 and the third wheel 153 as the rotation center is moved in one direction intersecting the traveling direction Ds in a case where the traveling direction Ds of the moving body 10 is changed; a signal synthesis step S5 or S5' of generating a wheel control signal obtained by synthesizing the rotation signal and the translation signal; and a wheel control step S6 of controlling each wheel based on the wheel control signal.

(6) A program according to a sixth aspect causes a computer 1100 of a movement control device 20 or 20*a* that controls each wheel of a moving body 10 having a first wheel 151 that is drivable and steerable, a second wheel 152 that is steerable, and a third wheel 153 that is steerable, to execute: a step of generating a rotation signal for controlling each wheel such that a traveling direction Ds of the moving body 10 is changed with one of the second wheel 152 or the third wheel 153 as a rotation center when viewed from a vertical direction Dv; a step of generating a translation signal for controlling each wheel such that one of the second wheel 152 and the third wheel 153 as the rotation center is moved in one direction intersecting the traveling direction Ds in a case where the traveling direction Ds of the moving body 10 is changed; a step of generating a wheel control signal obtained by synthesizing the rotation signal and the translation signal; and a step of controlling each wheel based on the wheel control signal.

INDUSTRIAL APPLICABILITY

According to the present disclosure, it is possible to provide a movement control device, a movement control system, a movement control method, and a program capable of smoothly changing a traveling direction of a moving body including a wheel having a simplified configuration in a narrow passage.

REFERENCE SIGNS LIST

1: movement control system
10: moving body
11: car body
11*a*: front surface
11*b*, 11*c*: end edge
12: straddle leg
13: mast
14: fork
15: traveling mechanism
16: sensor
20, 20*a*: movement control device
21: movement information acquisition unit
22: rotation center determination unit
23: rotation signal generation unit
24: translation signal generation unit
25: signal synthesis unit
26: wheel control unit
27: storage unit
28: clearance detection unit
29: translation signal update unit
30: host device
121: right straddle leg
122: left straddle leg
151: first wheel
151*a*: first wheel body
151*b*: first steering motor
151*c*: drive motor
152: second wheel
152*a*: second wheel body
152*b*: second steering motor
153: third wheel
153*a*: third wheel body
153*b*: third steering motor
1100: computer
1110: processor
1120: main memory
1130: storage
1140: interface
D1: passage extension direction
D2: passage width direction
Ds: traveling direction
Dsb: backward side
Dsf: forward side
Dv: vertical direction
Dvd: lower side
Dvu: upper side
Dw: car width direction
Dwl: other side
Dwr: one side
L1: first clearance
L2: second clearance
LF: logistics facility
O1: first rotational axis line
O2: second rotational axis line
O3: third rotational axis line
P1: first portion
P2: second portion
S1: movement information acquisition step
S2: rotation center determination step
S3: rotation signal generation step
S4: translation signal generation step
S5, S5': signal synthesis step
S6: wheel control step
S7: clearance detection step
S8: translation signal update step
W: wall body
X: target position

The invention claimed is:

1. A movement control device that controls each wheel of a moving body having a first wheel that is drivable and steerable, a second wheel that is steerable, and a third wheel that is steerable, the movement control device comprising:

a rotation signal generation unit that generates a rotation signal for controlling each wheel such that a traveling direction of the moving body is changed with one of the second wheel and the third wheel as a rotation center when viewed from a vertical direction;

a translation signal generation unit that generates a translation signal for controlling each wheel such that one of the second wheel and the third wheel as the rotation center is moved in one direction intersecting the traveling direction in a case where the traveling direction of the moving body is changed;

a signal synthesis unit that generates a wheel control signal obtained by synthesizing the rotation signal and the translation signal, the wheel control signal for moving the moving body in the one direction while turning the traveling direction around the rotation center; and a wheel control unit that controls each wheel based on the wheel control signal, wherein the wheel control unit is configured to move one of the second wheel and the third wheel, which serves as the rotation center, in only the one direction while maintaining the rotation angle, and simultaneously revolve the other wheel around the rotation center.

2. The movement control device according to claim 1, wherein, in a case where the moving body moves in a passage between a pair of wall bodies facing each other, the one direction matches a width direction of the passage.

3. The movement control device according to claim 2, further comprising:

a clearance detection unit that detects a first clearance between one wall body of the pair of wall bodies and the moving body and a second clearance between the other wall body of the pair of wall bodies and the moving body; and a translation signal update unit that updates the translation signal generated by the translation signal generation unit such that a difference between the first clearance and the second clearance is reduced, based on the first clearance and the second clearance detected by the clearance detection unit.

4. A movement control system comprising:

the moving body; and the movement control device according to claim 1.

5. A movement control method of controlling each wheel of a moving body having a first wheel that is drivable and steerable, a second wheel that is steerable, and a third wheel that is steerable, the movement control method comprising:

a rotation signal generation step of generating a rotation signal for controlling each wheel such that a traveling direction of the moving body is changed with one of the second wheel and the third wheel as a rotation center when viewed from a vertical direction;

a translation signal generation step of generating a translation signal for controlling each wheel such that one of the second wheel and the third wheel as the rotation center is moved in one direction intersecting the traveling direction in a case where the traveling direction of the moving body is changed;

a signal synthesis step of generating a wheel control signal obtained by synthesizing the rotation signal and the translation signal, the wheel control signal for moving the moving body in the one direction while turning the traveling direction around the rotation center; and a wheel control step of controlling each wheel based on the wheel control signal, wherein in wheel control step, to move one of the second wheel and the third wheel, which serves as the rotation center, in only the one direction while maintaining the rotation angle, and simultaneously revolve the other wheel around the rotation center.

6. A non-transitory computer-readable storage medium storing a program causing a computer of a movement control device that controls each wheel of a moving body having a first wheel that is drivable and steerable, a second wheel that is steerable, and a third wheel that is steerable, to execute:

a step of generating a rotation signal for controlling each wheel such that a traveling direction of the moving body is changed with one of the second wheel and the third wheel as a rotation center when viewed from a vertical direction;

a step of generating a translation signal for controlling each wheel such that one of the second wheel and the third wheel as the rotation center is moved in one direction intersecting the traveling direction in a case where the traveling direction of the moving body is changed;

a step of generating a wheel control signal obtained by synthesizing the rotation signal and the translation signal, the wheel control signal for moving the moving body in the one direction while turning the traveling direction around the rotation center; and a step of controlling each wheel based on the wheel control signal to move one of the second wheel and the third wheel, which serves as the rotation center, in only the one direction while maintaining the rotation angle, and simultaneously revolve the other wheel around the rotation center.

* * * * *